United States Patent [19]

Ida et al.

[11] Patent Number: 4,799,116
[45] Date of Patent: Jan. 17, 1989

[54] APPARATUS FOR CONTROLLING AN AUTO-REVERSE TAPE RECORDER HAVING A MODE-CHANGING MECHANISM

[75] Inventors: Mitsuru Ida, Saitama; Noriyuki Koga, Tokyo, both of Japan

[73] Assignee: Sony Corporation, Tokyo, Japan

[21] Appl. No.: 903,293

[22] Filed: Sep. 3, 1986

[30] Foreign Application Priority Data

Sep. 9, 1985 [JP] Japan .................... 60-199258
Oct. 14, 1985 [JP] Japan .................... 60-228187

[51] Int. Cl.[4] ........................ G11B 15/44
[52] U.S. Cl. .................. 360/74.1; 360/96.2
[58] Field of Search ............. 360/74.1–74.6, 360/96.1–96.5

[56] References Cited

U.S. PATENT DOCUMENTS

| | | | |
|---|---|---|---|
| 4,223,362 | 9/1980 | Kishi | 360/74.1 |
| 4,225,894 | 9/1980 | Fulukawa et al. | 360/74.1 |
| 4,238,808 | 12/1980 | Tomita | 360/96.1 |
| 4,309,727 | 1/1982 | Osanai | 360/74.1 |
| 4,497,001 | 1/1985 | Hayashi et al. | 360/74.2 |
| 4,520,415 | 5/1985 | Kobayashi et al. | 360/74.1 |
| 4,542,430 | 9/1985 | Tomita et al. | 360/74.1 |
| 4,581,665 | 4/1986 | Ito et al. | 360/74.1 |
| 4,583,139 | 4/1986 | Saito | 360/96.1 |
| 4,591,932 | 5/1986 | Aratani | 360/74.1 |
| 4,602,302 | 7/1986 | Haruta | 360/74.2 |
| 4,603,358 | 7/1986 | Sakurai et al. | 360/74.1 |
| 4,620,242 | 10/1986 | Takahashi | 360/74.1 |

OTHER PUBLICATIONS

Owners Manual, Technics Tape Deck Model RS-B78R, avail. 1/84.

Primary Examiner—Raymond F. Cardillo
Assistant Examiner—David L. Robertson
Attorney, Agent, or Firm—Lewis H. Eslinger; Jay H. Maioli

[57] ABSTRACT

In an auto-reverse type tape recorder also capable of repeatedly playing a tape in both directions, the tape travel is not shut off when the mode of operation is manually changed over from the normal run mode to the reverse run mode, or vice-versa, and after a changeover to the record mode, manual changeover operation is locked-out or made impossible in order to prevent the travel of the tape from being inadvertently changed over and, further, the travel of the tape is stopped without fail at the end of either the normal run mode or the reverse run mode.

24 Claims, 32 Drawing Sheets

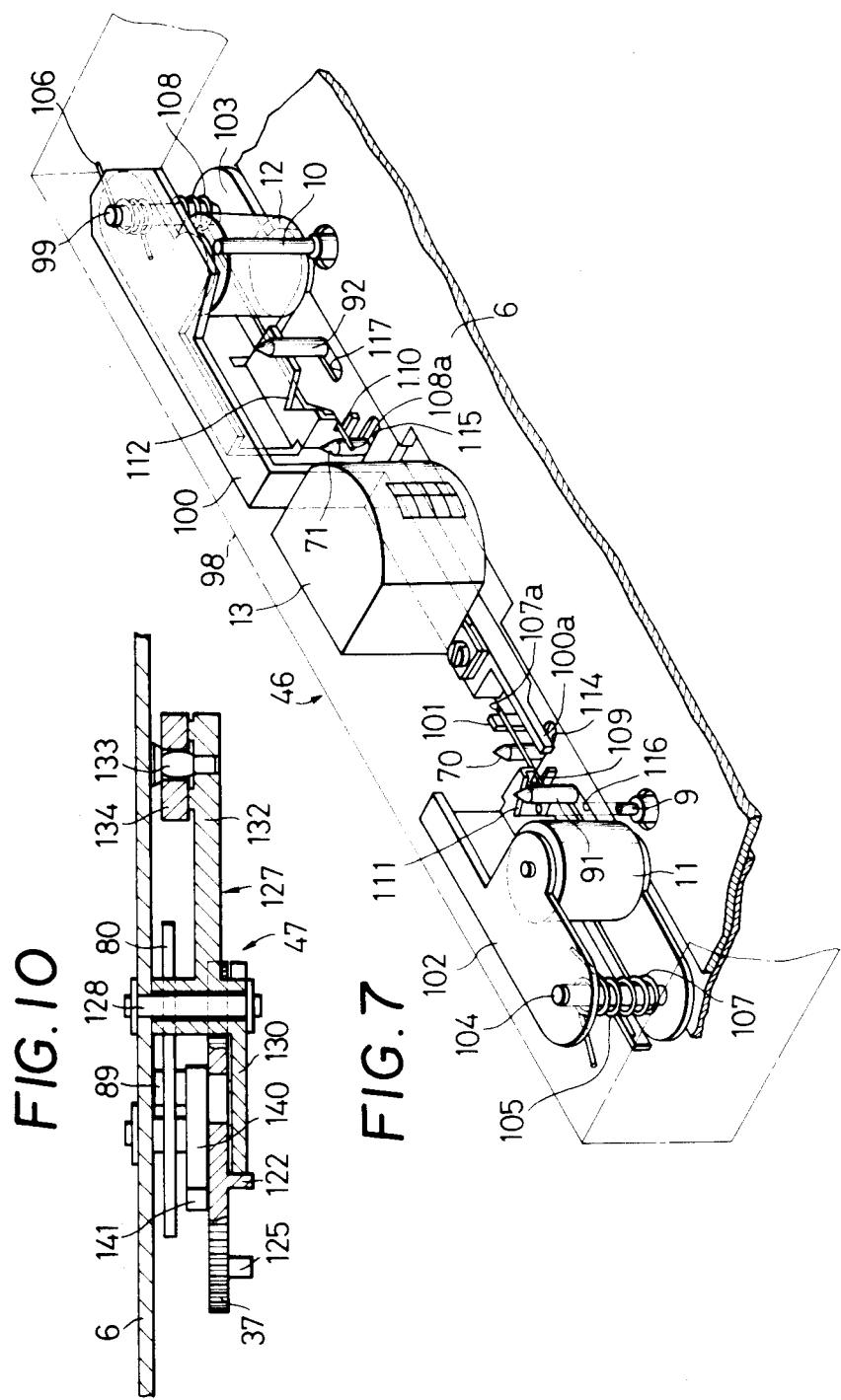

FIG. 8B

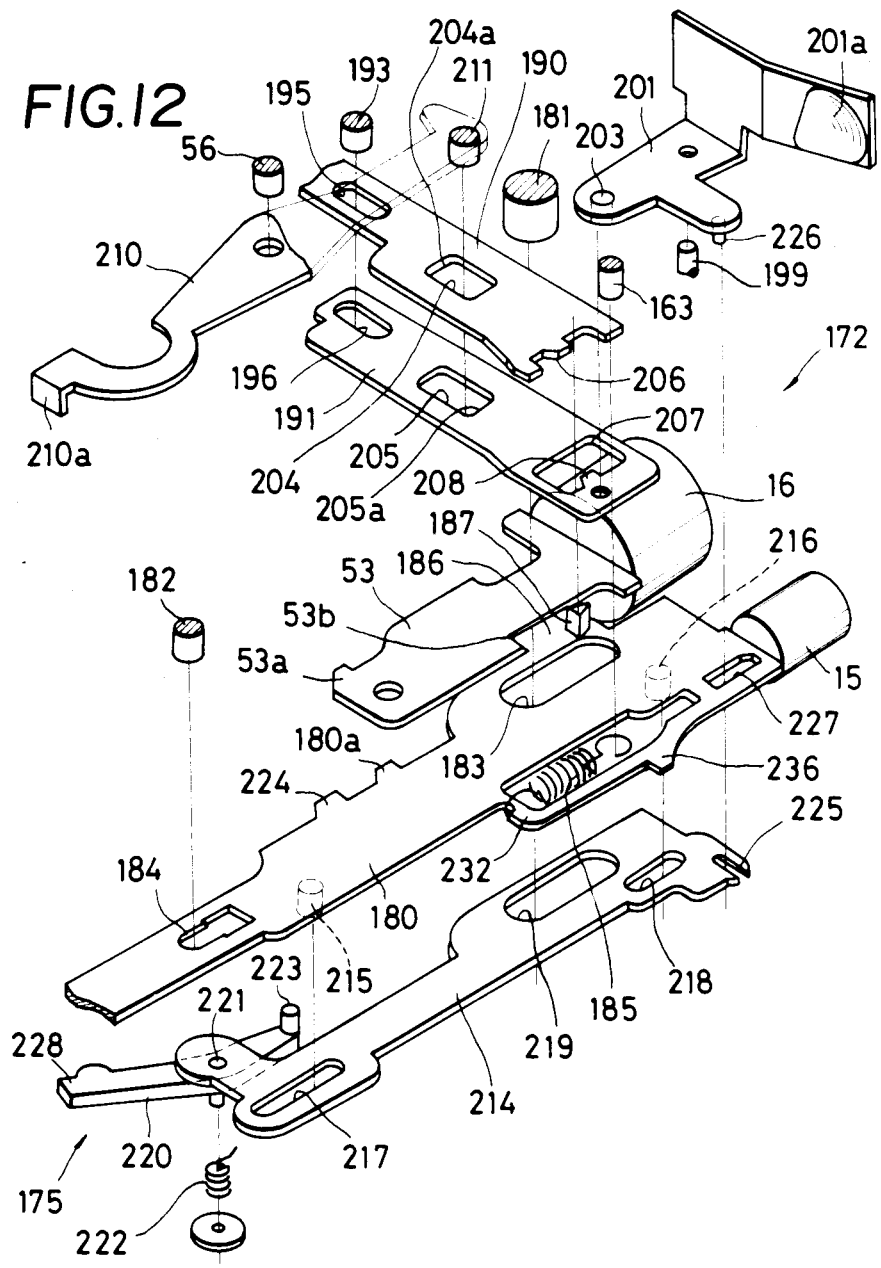

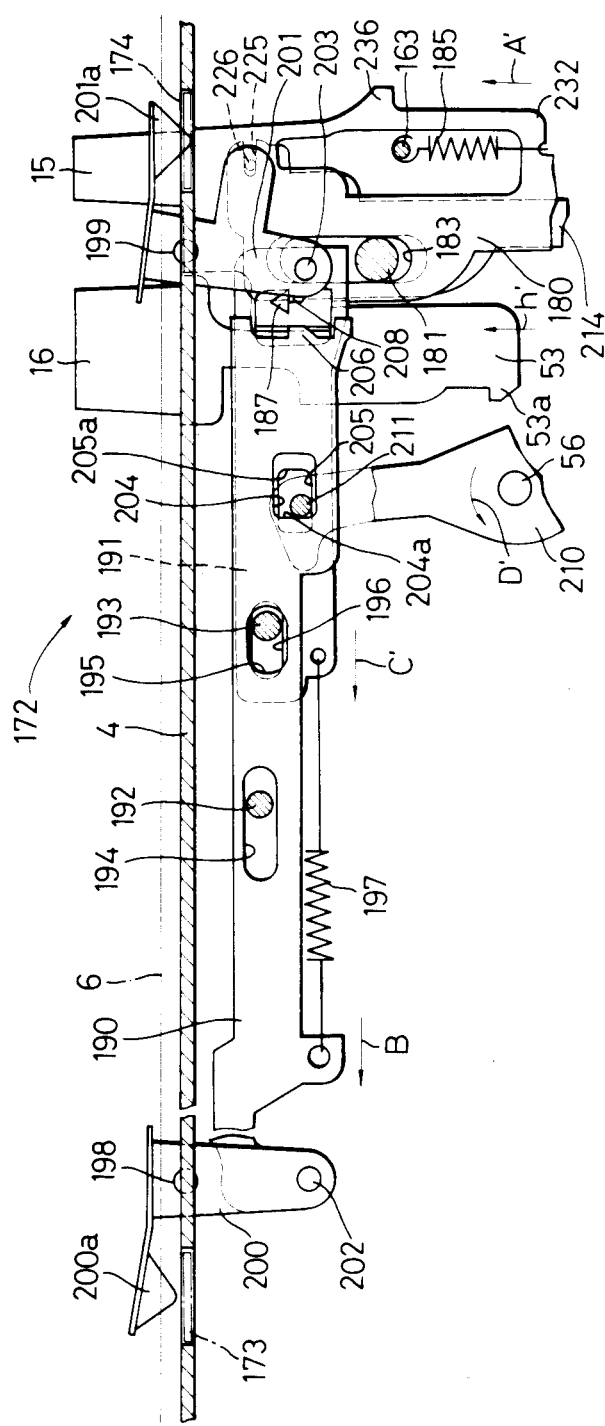

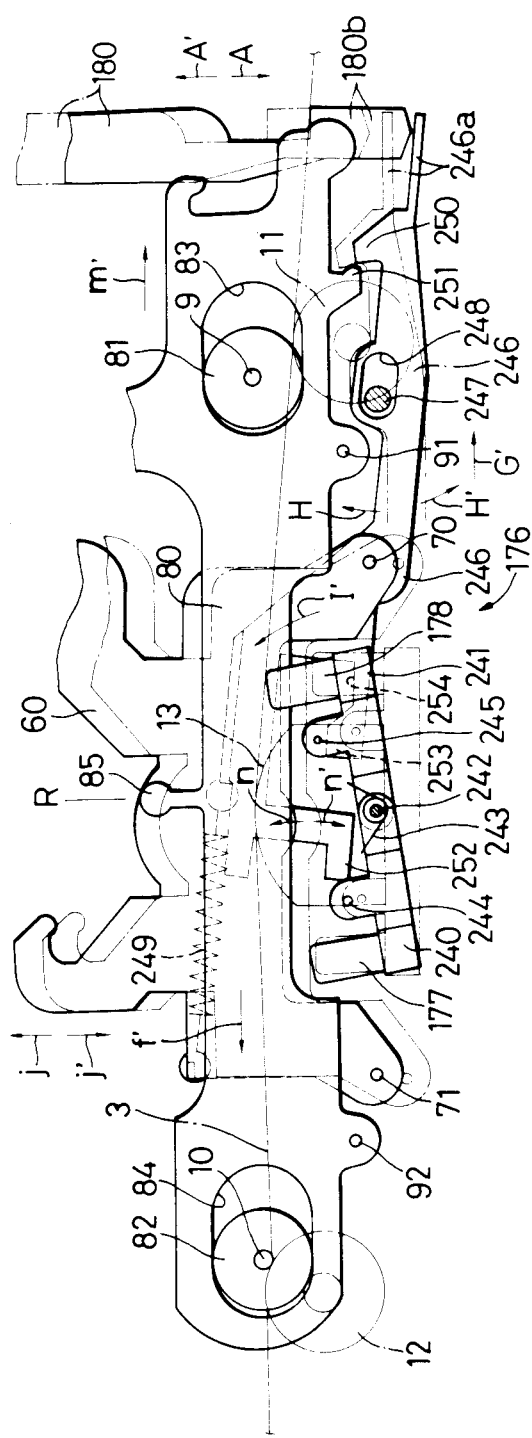

APPARATUS FOR CONTROLLING AN AUTO-REVERSE TAPE RECORDER HAVING A MODE-CHANGING MECHANISM

BACKGROUND OF THE INVENTION

1. Field of the Invention

This invention relates generally to an auto-reverse tape recorder and, more particularly, to an auto-reverse cassette tape recorder wherein tape travel is changed over not only automatically but also manually from the normal run mode to the reverse run mode, or vice-versa.

2. Description of the Background

In conventional auto-reverse tape recorders, there is the capability that the tape travel can be manually changed from the normal run mode to reverse run mode, or vice-versa, by operation of a changeover mechanism. Other known tape recorders include both a shut-off mechanism for shutting off the tape travel at the changeover point between the normal run mode and the reverse run mode, and a mode changing mechanism for changing over into the auto-repeat or continuous play mode, in order that the travel of the tape is shut off after normal run or reverse run (shut-off mode), or set in an auto-repeat mode (repeat mode) when the shut-off mechanism is placed in its working state by operation of the mode changing mechanism.

The changeover mechanism and the mode changing mechanism make operation of the tape recorder convenient, however, when they are both incorporated in the same tape recorder it presents a problem that the travel of the tape is shut off at the changeover point between normal run and reverse run when the changeover mechanism is operated under the state of the shut-off mode of the mode changing mechanism. Therefore, it is necessary for the mode changing mechanism to be changed over to the repeat mode, whenever the changeover mechanism is operated.

Furthermore, if the recording function is added to the auto-reverse type tape recorder in addition to the auto-reverse playback function, when the changeover means is operated in the record mode, the travel of the tape is changed over from normal run to reverse run, or vice-versa, so that double recording or the like is apt to happen. In addition, when recording is performed in the repeat mode of the mode changing mechanism, double recording or the like is also apt to happen, because the travel of the tape is changed to reverse run after one shuttle of the tape travel is completed.

Therefore, the care that must be exercised is rather troublesome in that it is necessary for the changeover mechanism not to be operated carelessly, or for the mode changing mechanism to be changed to the shut-off mode if a recording operation is performed.

OBJECTS AND SUMMARY OF THE INVENTION

Accordingly, it is an object of the present invention to provide an auto-reverse type tape recorder that can eliminate the above-noted defects inherent in heretofore known apparatus.

Another object of this invention is to provide an auto-reverse type tape recorder in which a mode changing mechanism for changing over the auto-repeat playback of a tape is automatically changed to the repeat mode, even though it is in the shut-off mode, whenever a changeover mechanism for changing over the tape drive direction from the normal run mode to the reverse run mode, or vice-versa, is operated.

A further object of this invention is to provide an auto-reverse type tape recorder in which a mode changing lever of a mode changing mechanism for changing over the auto-play or continuous play mode, is forcibly swung by operation of a rod of the changeover mechanism for changing over the direction of tape travel from normal to reverse, so that a shut-off lever of a shut-off mechanism is made inoperative.

A still further object of this invention is to provide an auto-reverse type tape recorder, in which the manual operation of changing over the direction of tape travel from normal to reverse, or from reverse to normal is prevented during the recording mode.

Still another object of this invention is to provide an auto-reverse type tape recorder, in which a changeover rod of the mode changeover mechanism is locked so as to be inoperative in the record mode.

Another object of this invention is to provide an auto-reverse type tape recorder, in which tape travel is always inhibited after a reverse run in the record mode, even thought the mode changing mechanism is still set in the repeat mode.

A further object of this invention is to provide an auto-reverse type tape recorder, in which the mode changing mechanism is changed over by operation of a record initiating rod in the changeover mechanism.

In accordance with an aspect of the present invention, an auto-reverse type tape recording apparatus comprises a changeover mechanism for changing selectively the direction of tape travel from a normal run to a reverse run, or vice-versa, by operation of a changeover lever, in which a shut-off mechanism is provided for shutting off the tape travel near the tape end, and a mode changing mechanism is provided for changing over the auto-repeat or endless play of the tape from the shut-off mode to the repeat mode, in which the travel of the tape is shut-off as soon as the tape end is detected after the normal or reverse run, or after the reverse run following the normal run, or in which the travel of the tape is repeatedly performed from the normal run mode to the reverse run mode, or vice-versa, under the control of the shut-off mechanism, and further includes a switch means for changing over the auto-repeat mode to the repeat mode by operation of the changeover means during the time that the mode changing mechanism is in the shut-off mode.

The above and other objects, features, and advantages of the present invention will become apparent from the following detailed description of illustrative embodiments thereof, to be read in conjunction with the accompanying drawings, throughout which like reference numerals designate the same or similar elements and parts.

BRIEF DESCRIPTION OF THE DRAWINGS

FIG. 7 is a perspective view of a head mounting mechanism;

FIGS. 8A and 8B are plan views of the head mounting mechanism of FIG. 7;

FIG. 10 is a cross-sectional view of the triggering mechanism of FIGS. 9A to 9D;

FIG. 12 is an exploded, perspective view of a recording mechanism and a shut-off mechanism operative only during a recording mode;

FIGS. 13A to 13C are plan views of the recording mechanism of FIG. 12;

FIGS. 16A and 16B are plan views of the erase head moving mechanism of FIG. 15.

DETAILED DESCRIPTION OF PREFERRED EMBODIMENTS

Figure 2:
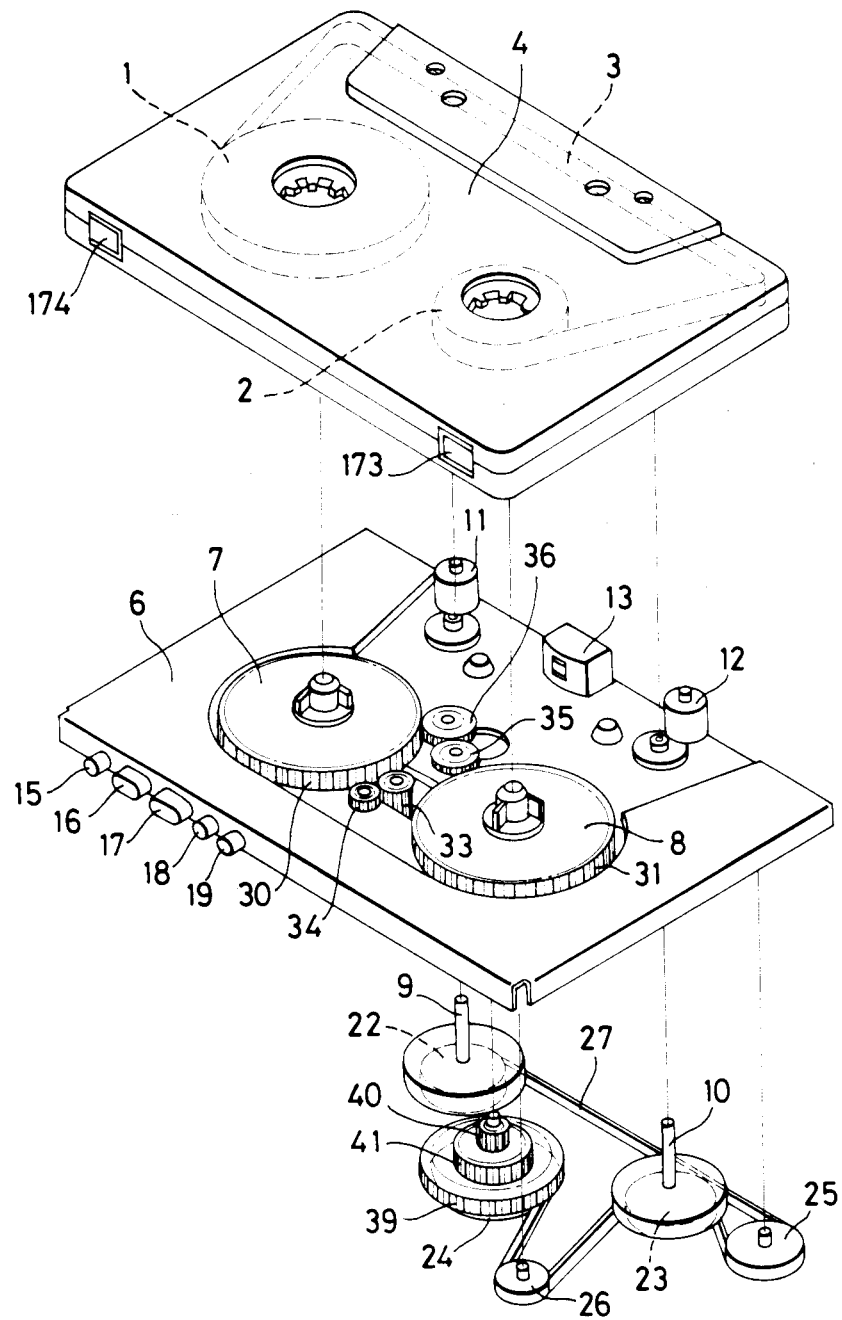
FIG. 2 is an exploded, perspective view of a tape driving system of a cassette tape recorder.

An application of this invention to an auto-reverse, small-size tape recorder that uses a compact cassette tape is described with reference to the accompanying drawings, in which FIG. 2 shows the tape driving system of such tape recorder having a tape cassette 4 that contains a magnetic tape 3 wound around right and left reels 1 and 2, respectively, and which is mounted horizontally above chassis 6. On chassis 6 are provided a left reel base 7 and a right reel base 8, two capstans 9 and 10 with two respective pinch rollers 11 and 12, and a magnetic playback and record head 13. When reels 1 and 2 of tape cassette 4 are mounted on chassis 6 they are engaged with respective reel bases 7 and 8, and magnetic tape 3 is passed over capstans 9 and 10 and is adjacent magnetic head 13. Mounted on the front of chassis 6 are various changeover buttons, such as a record button 15, a playback button 16, a stop button 17, a fast forward button 18, and a rewind button 19.

Figure 3:
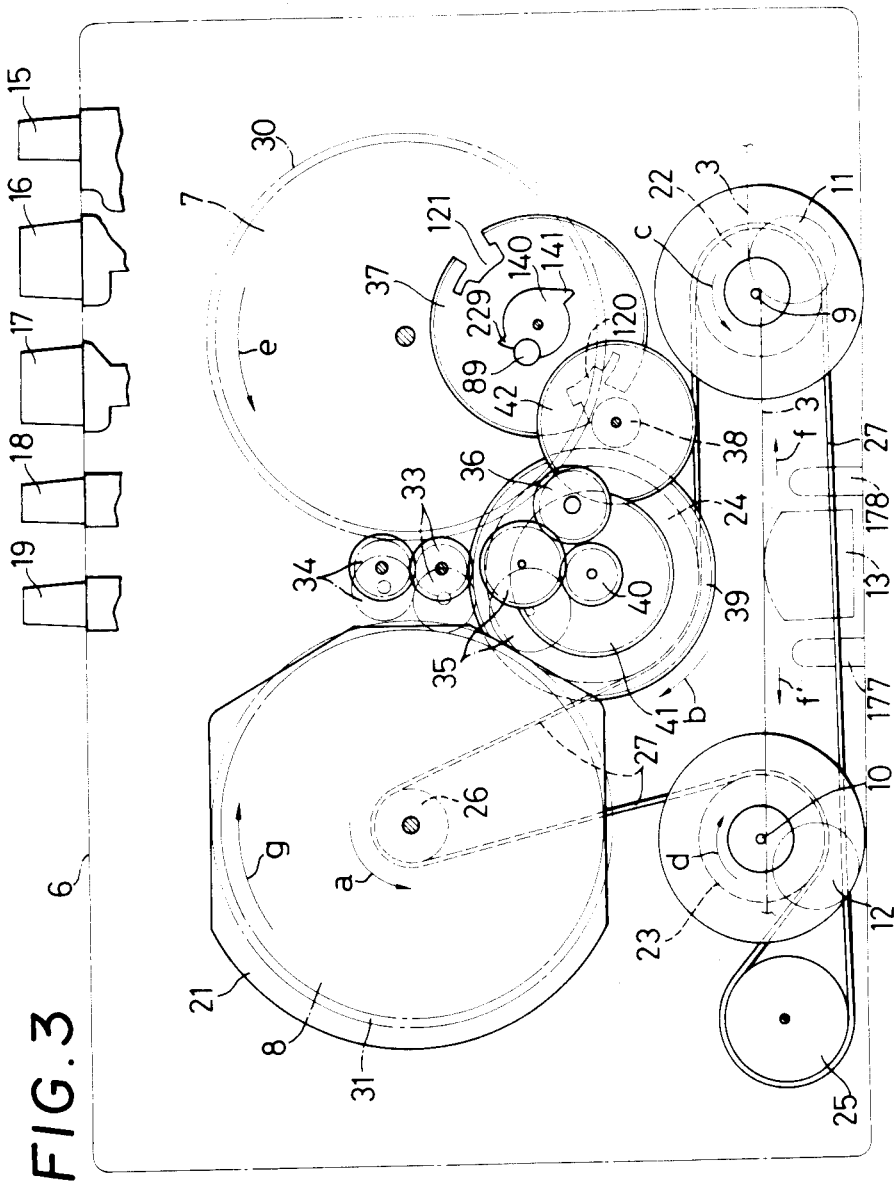
FIG. 3 is a plan view of the tape driving system of FIG. 2.

As shown in FIGS. 2 and 3 arranged below chassis 6 are a flat, thin motor 21 mounted coaxially with reel base 8, and capstan pulleys 22 and 23, which also serve as fly-wheels, are affixed to the lower ends of respective capstans 9 and 10. A driven pulley 24 is provided substantially at a middle position between reel bases 7 and 8, and a guide pulley 25 is arranged at one side of capstan pulley 23. These elements are driven by a flexible, elastomeric, drive belt 27 that is looped among pulleys 22, 23, 24, and 25, and driving pulley 26 of motor 21.

Reel base gears 30 and 31 are arranged on chassis 6 at the outer peripheries of respective reel bases 7 and 8, and between said reel bases 7 and 8 there is provided a first gear 33 and a second gear 34 to provide, respectively, the fast-forward and rewind modes of magnetic tape 3, and gears 35 and 36 for providing the normal and reverse modes, respectively. Arranged below chassis 6 is a gear 37 that has gear teeth on only a portion of its circumference and which changes over magnetic tape 3 from normal to reverse, or vice-versa, and also arranged below chassis 6 is a driving gear 38 which intermittently drives gear 37.

When any of record button 15, playback button 16, fast forward button 18, and rewind button 19 is pressed, a power switch (not shown) is actuated and motor 21 is caused to rotate with constant speed, so that driving pulley 26 rotates in the direction of arrow a shown in FIG. 3, and driven pulley 24 and capstan pulleys 22 and 23 are rotated by means of belt 27 in the directions of respective arrows b, c, and d.

When fast forward button 18 is pressed, first gear 33 is engaged with driving gear 39 that is formed integrally with driven pulley 24, as shown in solid lines in FIG. 3, and, simultaneously, second gear 34, which is always engaged with first gear 33, is selectively engaged with reel base gear 30 of reel base 7 by operation of the changeover mechanism. This causes reel base 7 to be driven at high speed in the direction of arrow e, thus, resulting in a fast forward mode in which magnetic tape 3 is driven in the direction of arrow f and then taken up by reel 1 at high speed.

When rewind button 19 is pressed, first gear 33 is selectively engaged with both driving gear 39 and reel base gear 31 of the other reel base 8, as shown in chain-dotted lines in FIG. 3. This causes reel base 8 to be driven at high speed in the direction of arrow g, thus, leading to a rewind mode in which magnetic tape 3 is driven in the direction of arrow f' and taken up by reel 2 at high speed.

Figure 4:
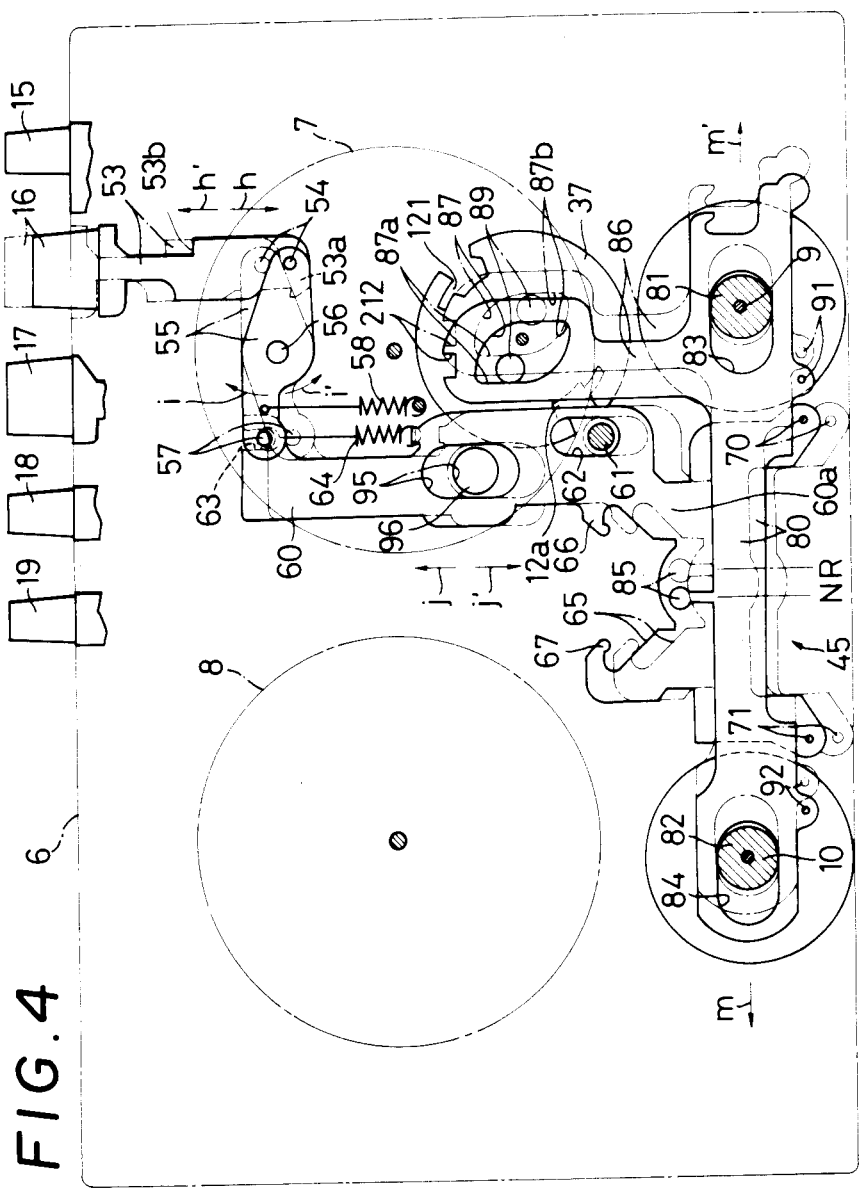
FIG. 4 is a plan view of a changeover mechanism for changing the direction of tape travel from normal to reverse or from reverse to normal.

When playback button 16 is pressed, gear 35, which is always engaged with driving gear 40, which is coaxially arranged with driven pulley 24, is rotated in the same direction as driven pulley 24 through a torque limiter (not shown), is selectively engaged with driven gear 36, which is always engaged with reel base gear 30 of reel base 7, as indicated in solid lines in FIG. 3, by operation of the changeover mechanism 45 of FIG. 4 changing over into the auto-repeat or endless play mode. Simultaneously, magnetic tape 3 is brought into contact with magnetic head 13 by operation of head holding mechanism 46, which will be described in detail hereinbelow, and also pinch roller 11 is pressed against capstan 9. This causes reel base 7 to be driven in the direction of arrow e, which results in a normal playback mode in which magnetic tape 3 is driven in the direction of arrow f and taken up by reel 1, so that normal playback is performed by magnetic head 13.

When the normal run of magnetic tape 3 reaches the tape end, partially toothless gear 37 is selectively engaged with driving gear 38, which is formed integrally with driven gear 42 that is driven by driving gear 41, which is formed coaxially and integrally with driven pulley 24, by operation of later described triggering mechanism 47, so that partially toothless gear 37 rotates one-half revolution. Then, changeover mechanism 45 is driven and changed over to the reverse run, this causes gear 35 to be selectively engaged with reel base gear 31 of reel base 8, as indicated in chain-dotted lines in FIG. 3, and also pinch roller 12 is pressed against capstan 10. Reel base 8 is then driven in the direction of arrow g resulting in a reverse playback mode in which magnetic tape 3 is driven in the direction of arrow f' and taken up by reel 2 of FIG. 2, so that reverse playback is performed by magnetic head 13.

This tape recorder also has a recording function and two tabs 173 and 174 for preventing the A and B sides of the tape from being erroneously erased are provided in the rear wall of the tape cassette 4, as shown in FIG.

2. The presence or absence of tabs 173, 174 is detected by a recording mechanism 172, which will be described in detail hereinbelow, so that normal and reverse recording can be conducted just as the above-described normal and reverse playback operations take place by pressing record button 15. In such record mode, two erase heads 17 and 18 for normal run and reverse run are selectively brought into contact with magnetic tape 3 by operation of an erase head moving mechanism 176, which will be described in detail hereinbelow.

Figure 1:
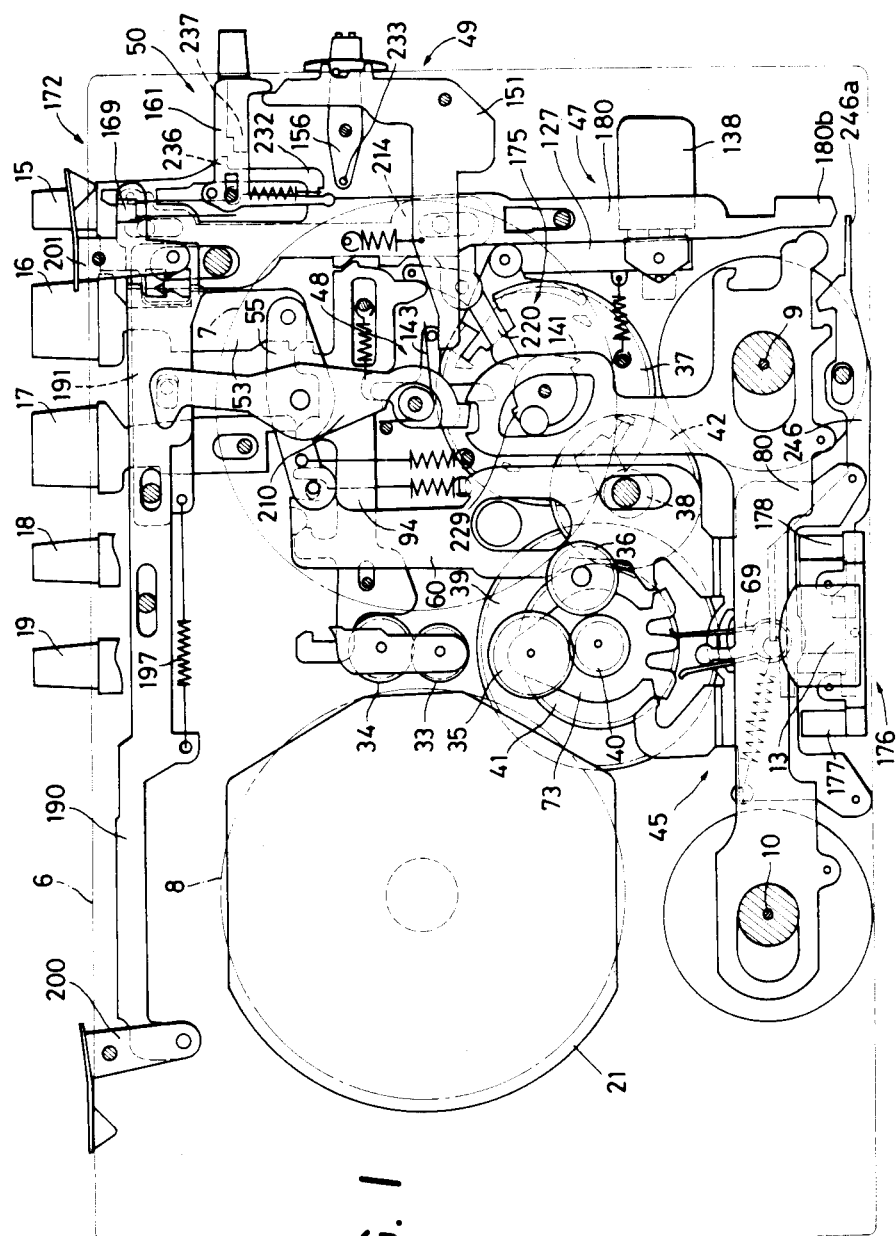
FIG. 1 is a plan view of an auto-reverse type tape recorder in accordance with an embodiment of the present invention.

In any of these fast forward, rewind, playback or record modes, when stop button 17 is pressed, the power switch (not shown) is turned off and motor 21 stops, and gears 33 and 34 or gear 35 are returned to neutral positions, as shown in FIG. 1, thereby resulting in a stop mode.

In this tape recorder, the drive of magnetic tape 3 can be shut-off automatically at the tape end by operation of a shut-off mechanism, which will be described in detail hereinbelow, and the stop mode is automatically obtained. In addition, this tape recorder can be enabled for selective changeover to a one cycle mode in which the magnetic tape 3 stops after a reverse run that follows a normal run and also can be enabled for a repeat mode in which magnetic tape 3 repeatedly continues to be driven back and forth between a normal run and reverse run. This tape recorder can also be enabled so that magnetic tape 3 can be manually changed over, as well as automatically, from normal run to reverse run.

Further, by means of a shut-off mechanism 175, which will be described hereinbelow, changing over from normal run to reverse run in the record mode, a shut-off motion is generated only when there is no tab 174 present for the B side of the tape cassette 4. In the record mode the tape recorder mechanism is arranged so that the mode changing mechanism 49 will be forcibly switched to the one-cycle mode and mechanism 50 will be locked into a state preventing changeover.

The details of changeover mechanism 45 for switching from normal to reverse or vice-versa are shown in FIG. 1 and in FIGS. 4 to 6C, more specifically, in FIG. 4 playback button 16 is affixed to one end of a playback operating rod 53, which is formed so as to be capable of moving in both directions of arrows h and h'. Rod 53 is arranged below chassis 6 and is connected at the other end thereof to connecting lever 55 by means of a pin 54. Connecting lever 55 is rotatably mounted by a shaft 56 on chassis 6 so as to pivot in the directions of arrows i and i', with the other end thereof having affixed thereto a pin 57. Connecting lever 55 is urged in the direction of arrow i' by the force of a return spring 58, which is stretched from connecting lever 55 to a post on chassis 6.

Figure 5:
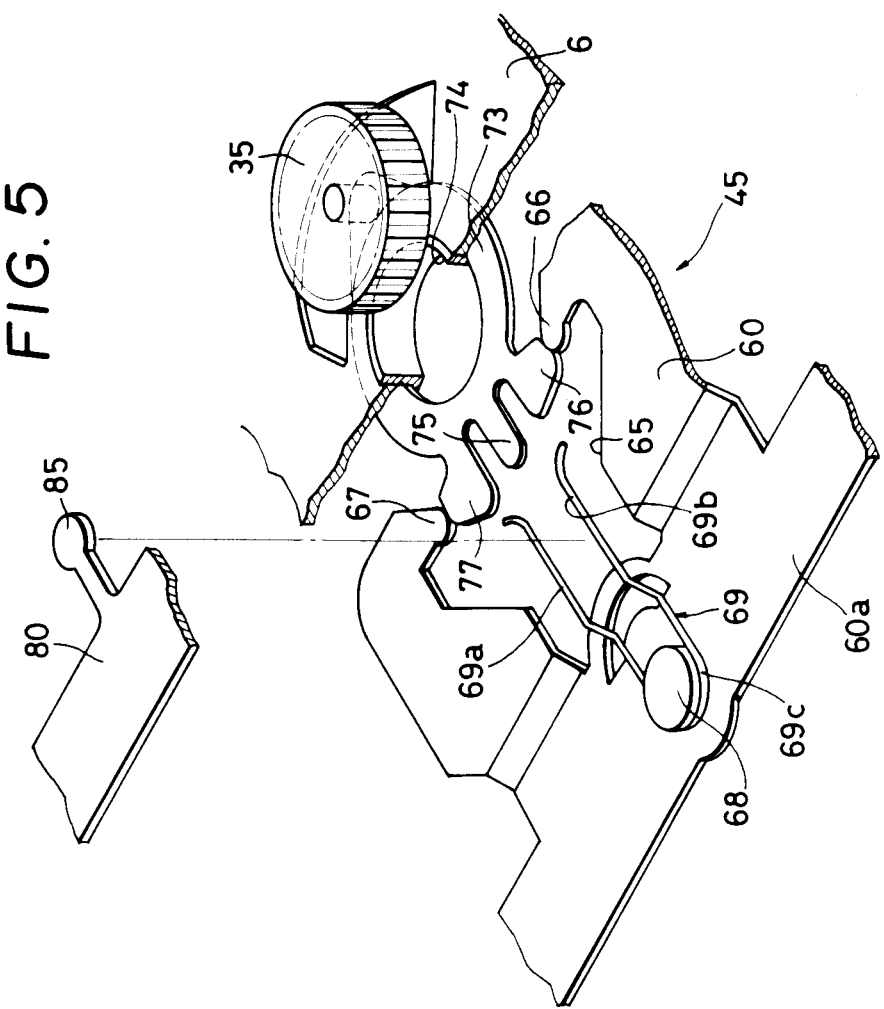
FIG. 5 is an exploded, perspective view of a portion of the changeover mechanism of FIG. 4.

Mounted beneath chassis 6 is a driving member 60 that is arranged for front to back sliding motion relative to chassis 6. Driving member 60 is substantially L-shaped and is arranged for sliding motion in the directions of arrows j and j' and is limited in its travel by elongated hole 62 that cooperates with a shaft 61 of driving gear 38. Pin 57 of connecting lever 55 is fitted in a U-shaped notch 63 that is formed at one end of driving member 60, and a tension spring 64 is stretched from pin 57 to driving member 60. The end portion 60a of driving member 60 that is opposite the end adjacent pin 57 is formed almost symmetrically with a right and left pair of restricting projections 66 and 67. Projections 66 and 67 are provided on both sides of a groove 65 formed in the end portion 60a. As shown in FIGS. 5 to 6C, shaft 68 is press-fit into a central portion of end portion 60a of driving member 60, with a U-shaped wire spring 69 mounted at the closed end on shaft 68. More specifically, wire spring 69 is fitted to shaft 68 at a central portion 69c so that the two arm portions 69a and 69b project on the sides of groove 65. In this way spring 69 is free to swing in the directions of arrows k and k. A pair of driving pins 70 and 71 are affixed to the respective ends of the end portion 60a of driving member 60 so as to project above chassis 6.

As shown in FIGS. 5 to 6C, a drive changeover lever 73 is provided in the middle between reel bases 7 and 8 below chassis 6, and an inner portion of changeover lever 73 is fitted into a round hole 74 formed in chassis 6, whereby changeover lever 73 can freely swing in the directions of arrows 1 and 1'. Driving gear 40 is positioned within the periphery of changeover lever 73, and gear 35 is rotatably mounted at one end of changeover lever 73. At the other end of changeover lever 73, there are formed a projection 75 and a right and left pair of restricted projections 76 and 77. Projections 76 and 77 are symmetrically arranged relative to projection 75. Changeover lever 73 is arranged so that end portion 60a thereof is located within groove 65 of driving member 60 and so that the pair of projections 76 and 77 are placed between the pair of restricting projections 66 and 67. As a consequence, both arm portions 69a and 69b of wire spring 69 are located on respective sides of projection 75 of changeover lever 73. Gear 35, which is rotatably mounted on changeover lever 73, and driving gear 40 are always engaged with each other.

As shown in FIG. 4, a drive changeover rod 80 is arranged between chassis 6 and end portion 60a of driving member 60 as to make a right angle with the direction of movement of driving member 60. Drive changeover rod 80 is arranged to be freely moved in the direction of arrows m and m' between a normal position N, shown in solid lines, and a reverse position R, shown in chain-dotted lines. This movement is possible by a loose fit between guide shafts 81 and 82, the inner peripheries of which serve as the bearings of capstans 9 and 10, and respective slots 83 and 84 formed in drive changeover rod 80. A projection 85 for pressing wire spring 69 is provided at the central portion of drive changeover rod 80 and pressing projection 85 is formed so as to be inserted between the arms 69a and 69b of wire spring 69. One end portion of drive changeover rod 80 is provided with an arm 86 extending over the side of said partially toothless gear 37. A yoke cam 87 is formed in arm 86 and is engaged with a driving pin 89 that protrudes from the top surface of partially toothless gear 37. A pair of restricting pins 91 and 92 are affixed to drive changeover rod 80 and project above chassis 6.

In regard to the operation of changeover mechanism 45, in a stop mode indicated in chain-dotted lines in FIG. 4, when connecting lever 55 is moved backward in the direction of arrow i' by return spring 58, playback operating rod 53 is moved backward in the direction of arrow h' and, simultaneously, driving member 60 is pressed by pin 57 and is moved back toward a return position in the direction of arrow j'. In such stop mode, drive changeover rod 80 is stopped at either the normal position N, indicated by solid lines, or is stopped at the reverse position R, indicated the chain-dotted dash lines.

Figure 6A:
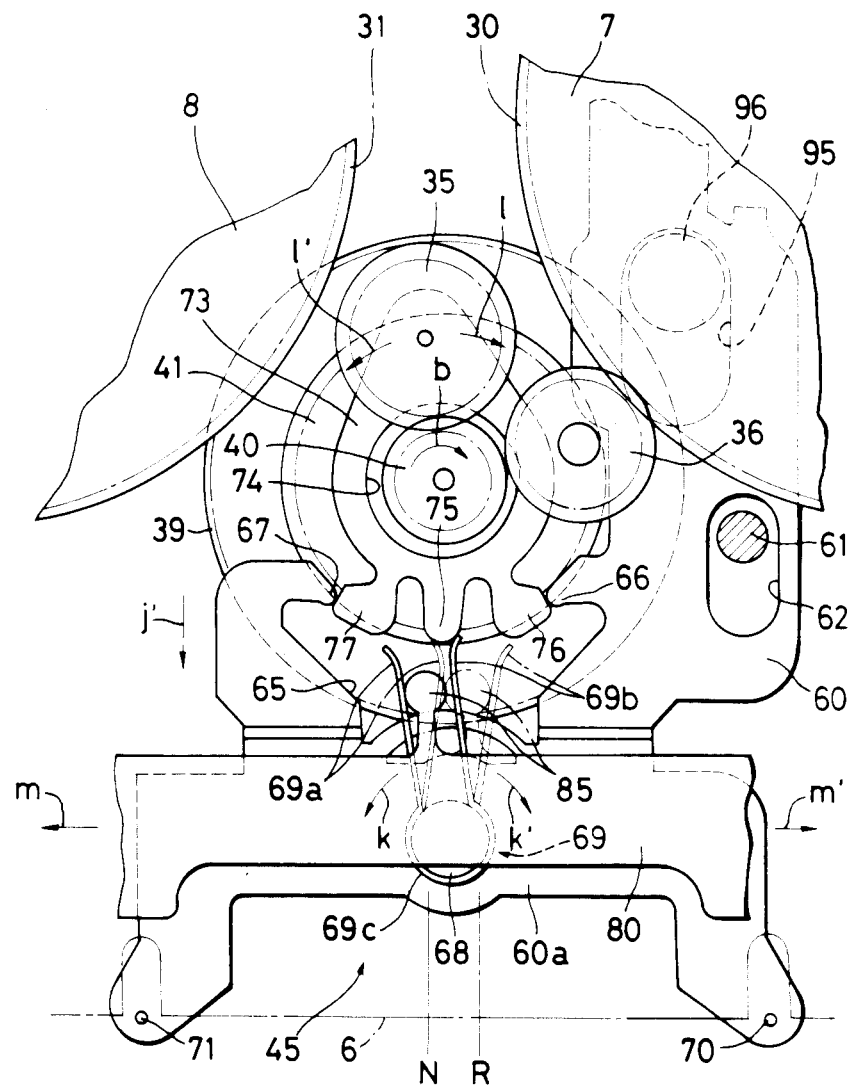
FIGS. 6A to 6C are plan views of respective portions of the changeover mechanism of FIG. 4.

As shown by the solid lines in FIG. 6A, when drive changeover rod 80 is moved to the normal position N, projection 85 of drive changeover rod 80 presses arm 69a of wire spring 69 from inside to outside, so that wire spring 69 is swung in the direction of arrow k and the other arm 69b of spring 69 presses portion 75 of changeover lever 73 from one side, whereby a torque that acts to swing changeover lever 73 in the direction of arrow l is generated. Nevertheless, because driving member 60 is in a state of being moved backward in the direction of arrow j', the pair of restricting elements 66 and 67 of driving member 60 are in contact with the pair of restricted portions 76 and 77 of changeover lever 73, respectively. Consequently, the swinging motion of changeover lever 73 in the direction of arrow l is prevented, so that said changeover lever 73 is kept in a neutral position against the force of wire spring 69.

When drive changeover rod 80 is in the reverse position R, pressing projection 85 of drive changeover rod 80 presses the other arm 69b of wire spring 69 from inside to outside, so that wire spring 69 is swung in the direction of arrow k' as indicated in chain-dotted lines, and arm 69a of spring 69 presses projection 75 of changeover lever 73 from the other side. Thus, a torque that acts to swing changeover lever 73 in the direction of arrow l' is generated. Nevertheless, the swinging motion of changeover lever 73 in the direction of arrow l' is also prevented in this situation by the driving member 60 in the state of being moved in the direction of arrow j', so that changeover lever 73 is kept in the neutral position against the force of wire spring 69.

When playback button 16 is pressed, as shown in FIG. 4, playback operating rod 53 is moved in the direction of arrow h and connecting lever 55 is moved in the direction of arrow i against the force of return spring 58, and then driving member 60 is moved in the direction of arrow j under the force of tension spring 64. Playback operating rod 53 will be locked, because a locking pawl 53a thereof is engaged with a locking portion 94a of a locking plate 94 in a forward position. This kind of locking plate is well known and is shown in more detail in FIG. 11a. Thus, driving member 60 is also locked in a forward position. Tension spring 64 functions to resiliently press connecting lever 55 against driving member 60 in the forward position thereof.

Figure 6B:
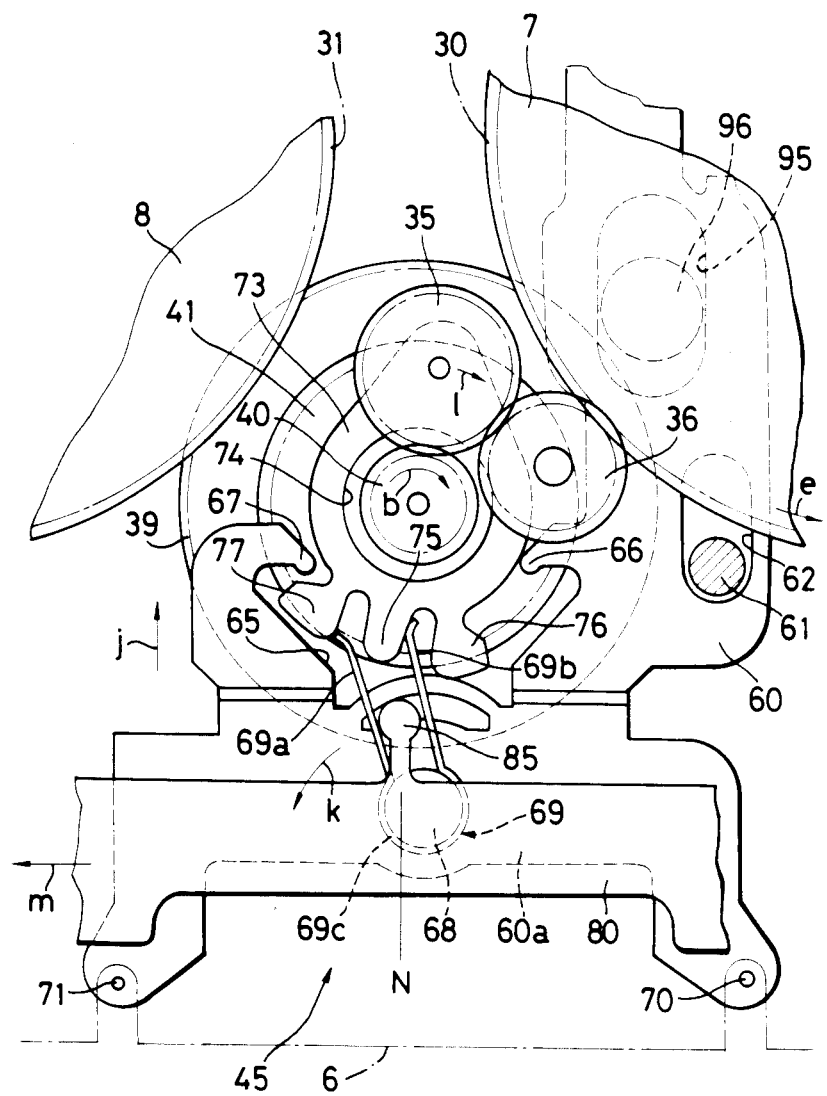
Figure 6C:
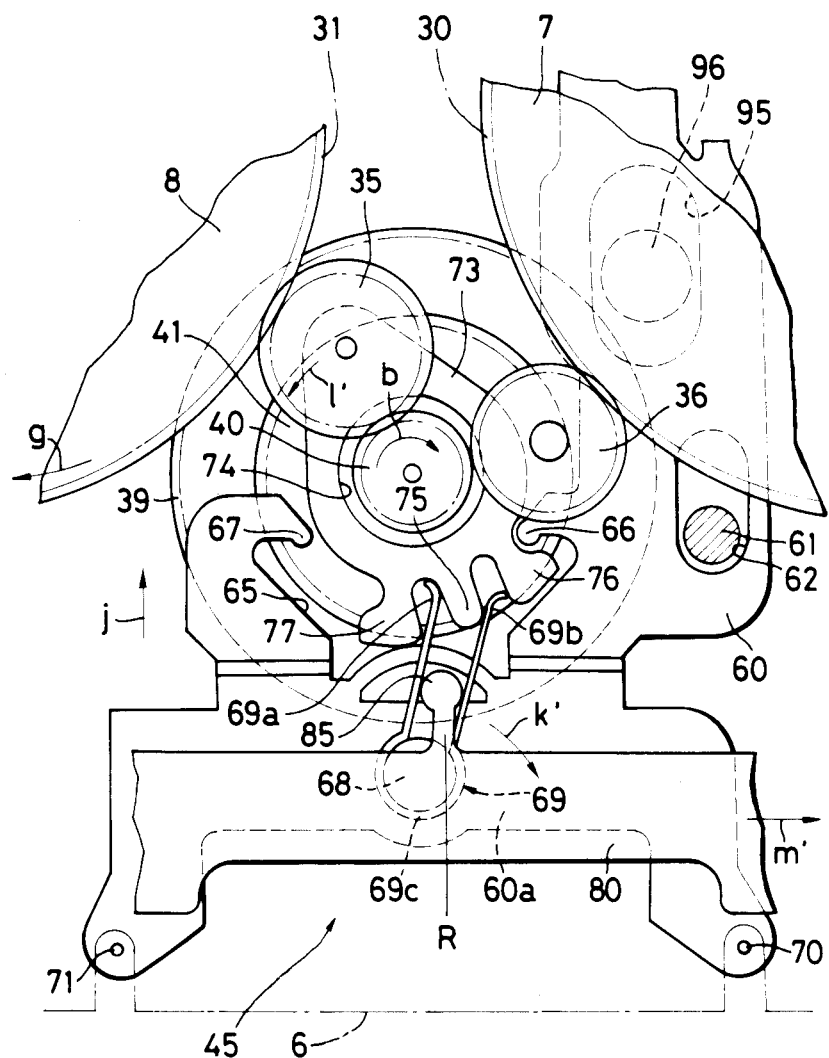

In FIG. 6B a state in which driving member 60 is moved in the direction of arrow j due to a changeover to the playback mode as described above is shown, in which drive changeover rod 80 is in the normal position N. More specifically, because of the forward movement of driving member 60, the pair of restricting projections 66 and 67 are simultaneously separated away from the pair of restricted positions 76 and 77, and wire spring 69 is also moved in the direction approaching changeover lever 73, so that one arm 69a of said wire spring 69 is relatively pressed by pressing projection 85 of drive changeover rod 80, and wire spring 69, while being further swung in the direction of arrow k, presses projection 75 of changeover lever 73 from one side by the other arm 69b of spring 69. As a result, the restriction on the swinging of changeover lever 73 is removed and, further coupled with the addition of the force of wire spring 69, changeover lever 73 is swung in the direction of arrow l, thereby leading to engagement of gear 35 with gear 36. Gear 35 is resiliently pressed against gear 36 by the force of wire spring 69, and rotation of gear 40 in the direction of arrow b is transmitted to reel base gear 30 through gears 35 and 36, and reel base 7 is driven in the direction of arrow e, thus, resulting in the playback mode.

When the magnetic tape 3 comes to the tape end in the normal playback mode, the stopping of rotation of reel base 7 is detected by means of detector 96, which may comprise a photosensor or the like, arranged in a portion of the elongated hole 95 provided in driving member 60. Thus, partially toothless gear 37 turned through approximately one-half of a rotations as shown in FIG. 4, and then by the cam action of driving pin 89 of said partially toothless gear 37 and yoke cam 87 of drive changeover rod 80, drive changeover rod 80 is driven in the direction of arrow m and is shifted from the normal position N to the reverse position R. When drive changeover rod 80 is shifted to the reverse position R, in the direction of arm m' as in FIGS. 6B and 6C, pressing projection 85 of drive changeover rod 80 is switched from a state in which one arm 69a of wire spring 69 is pressed to the state in which the other arm 69b is pressed. Thus, wire spring 69 is swung in the direction of arrow k', so that one arm 69a of wire spring 69 presses projection 75 of changeover lever 73 from the other side. At that time, because of the state to which driving member 60 has been shifted in the direction of arrow j in the playback mode, changeover lever 73 is not restricted in its swinging motion but is swung in the direction of arrow l', thereby resulting in the engagement of gear 35 with reel base gear 31. Gear 35 is resiliently pressed against reel base gear 31 by the force of wire spring 69. Rotation of gear 40 in the direction of arrow b is transmitted to reel base gear 31 through gear 35, and reel base 8 is driven in the direction of arrow g, so that it assumes the reverse playback mode.

When in the reverse playback mode, drive changeover rod 80 is driven in the direction of arrow m and is shifted from the reverse position R to the normal position, and changeover lever 73 is again pivotted in the direction of arrow l, as in FIG. 6B, so that it assumes the normal playback mode. In this way, the drive of magnetic tape 3 is selectively switched between normal run and reverse run only through the operation of drive changeover rod 80.

When the tape travel is switched to stop mode by operation of stop button 17, or by a shut-off motion in the normal playback mode shown in FIG. 6B or in the reverse playback mode shown in FIG. 6C, driving member 60 is moved in the direction of arrow j', as shown in FIG. 6A, so that changeover lever 73 is kept in a neutral position against the force of wire spring 69. In this case, wire spring 69 is moved, as shown in solid lines, when changeover to a stop mode takes place in the normal playback mode and, as shown in chain-dotted lines, when changeover takes place in the reverse playback mode. This causes changeover lever 73 to be kept in a neutral position under a state in which it is pushed resiliently along the direction of arrow l or l' as to be swingable, as aforementioned. In changeover mechanism 45, therefore, the normal or reverse playback mode that precedes the stop mode is mechanically memorized by the normal position N or reverse position R of drive changeover rod 80 and wire spring 69, and when a changeover from the stop mode to the playback mode is performed, the tape travel is automatically changed over to normal run (see FIG. 6B) or the reverse run (see FIG. 6C).

In the changeover mechanism, one arm 69a or the other arm 69b of the U-shaped wire spring 69 is pressed from inside to outside by pressing projection 85 of changeover rod 80, and the remaining arm portion of wire spring 69 presses changeover lever 73 so as to swing changeover lever 73, such that the spring forces are equal in the normal position N and reverse position R of drive changeover rod 80, whereby gear 35 is resiliently pressed against gear 36 or reel base gear 31 under the same conditions.

The operation of the head holding mechanism 46 are shown in FIGS. 7 to 8B, in which magnetic head 13 and pinch rollers 11 and 12 are mounted on cassette holder 98, which is secured to chassis 6 for relative free movement. More specifically, a head arm 100 is pivottally affixed to the cassette holder 98 through a shaft 99, so as to be freely rotated n the directions of arrows n and n', and magnetic head 13 is affixed to head arm 100. The distal end 100a of head arm 100 extends to the front of one driving pin 70 of driving member 60, with distal end 100a being formed with a projection 101. Pinch rollers 11 and 12 are rotatably affixed to the pinch roller levers 102 and 103, and pinch roller levers 102 and 103 are mounted for pivotting movement in the direction of arrows o and o', p and p' on shafts 104 and 99 respectively. Pinch roller levers 102 and 103 are urged in the directions of arrows o' and p' by torsion springs 105 and 106, respectively, which surround shafts 104 and 99. Other torsion springs 107 and 108 also surround shafts 104 and 99, and distal ends 107a and 108a of torsion spring 107 and 108, respectively, extend over to the front of a pair of driving pins 70 and 71 of driving member 60, and are engaged with engaging portions 109 and 110 formed in the distal ends of pinch roller levers 102 and 103, respectively. Distal end 107a of torsion spring 107 abuts the front side of projection 101 of head arm 100, and on the ends of pinch roller levers 102 and 103 V-shaped notches 111 and 112 are formed in respective correspondence with a pair of restricting pins 91 and 92 of drive changeover rod 80.

Figure 8A:
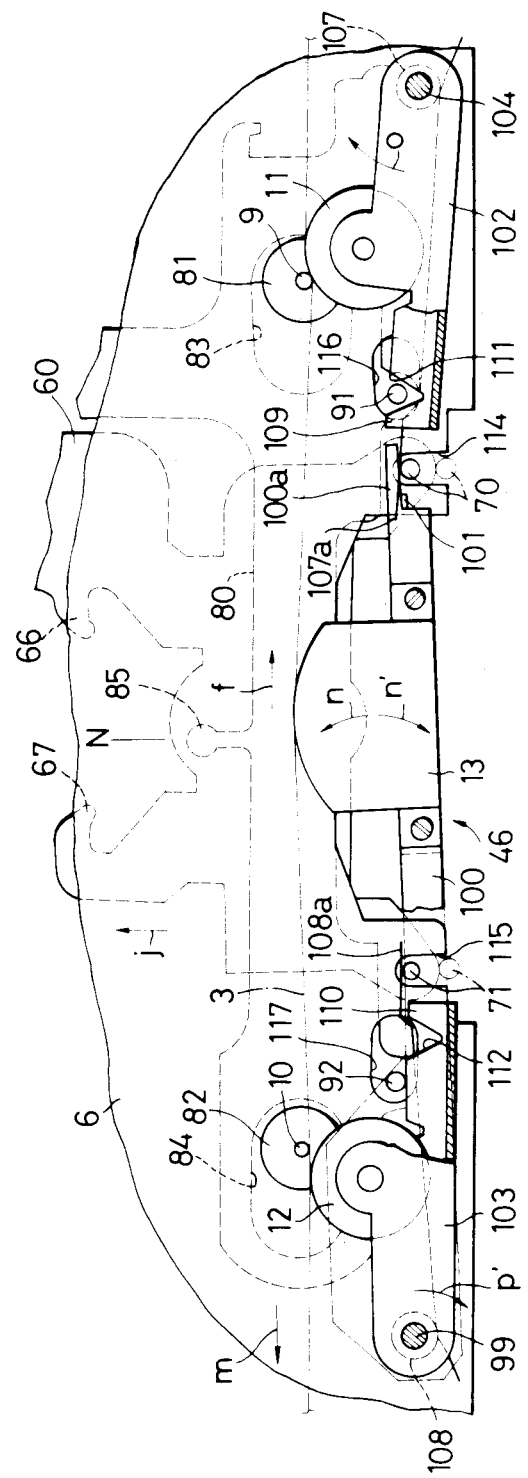
Figure 8B:
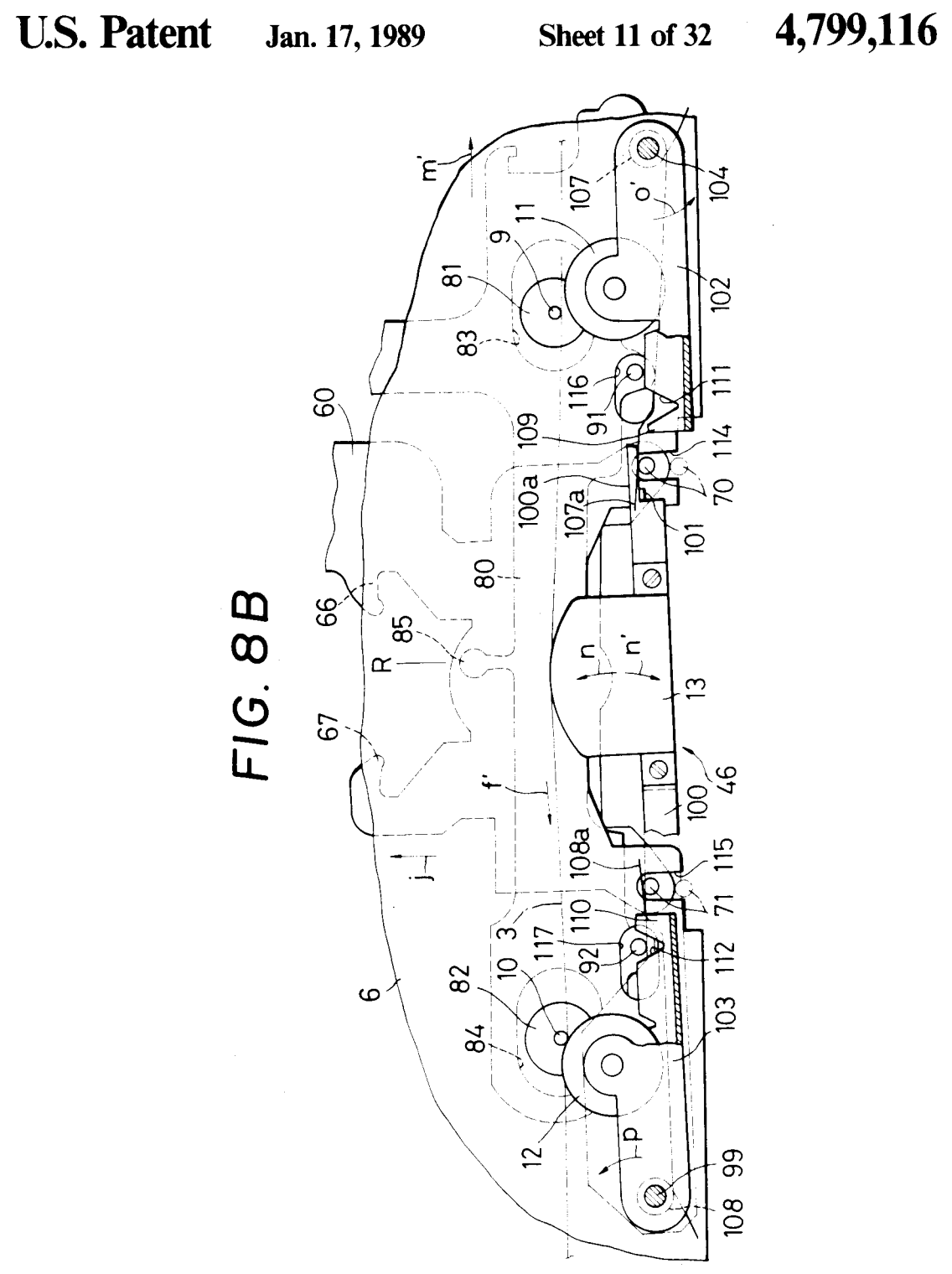

Head holding mechanism 46, operates such that in a stop mode driving member 60 is moved backward so that the pair of driving pins 70 and 71 are also moved backward, as indicated in chain-dotted lines in FIGS. 8A and 8B, within a pair of U-shaped notches 114 and 115 formed in chassis 6. This causes pinch roller levers 102 and 103 to be pivotted in the direction of arrows o' and p' by torsion springs 105 and 106, respectively, and both pinch rollers 11 and 12 are separated away from their respective capstans 9 and 10. Simultaneously, distal end 107a of torsion spring 107 presses projection 101 of head arm 100, so that head arm 100 is also moved back in the direction of arrow n', thereby leading to the separation of magnetic head 13 from magnetic tape 3.

When driving member 60 is moved forward in the direction of arrow j for the purpose of a changeover to the normal playback mode, when drive changeover rod 80 is in the normal position N, as shown in FIG. 8A, the pair of driving pins 70 and 71 are moved forward in the pair of U-shaped notches 114 and 115 and press, respectively, against the leading distal ends 107a and 108a of torsion springs 107 and 108. At such time, because drive changeover rod 80 is in the normal position N, a pair of restricting pins 91 and 92 of drive changeover rod 80 are also moved within a pair of elongated holes 116 and 117 formed in chassis 6, and while one restricting pin 91 is positioned in front of the notched portion 111 of pinch roller lever 102, the other restricting pin 92 is spaced apart from notched portion 112 of pinch roller lever 103. As a consequence, only pinch roller lever 102 is moved forward in the direction of arrow o, whereas pinch roller 11 is pressed against capstan 9, and pinch roller lever 103 is restricted by restricting pin 92 and kept in the state that it has been moved in the direction arrow p', causing pinch roller 12 to be separated from capstan 10. Since one driving pin 70 directly presses distal end 100a of head arm 100 it is moved forward in the direction of arrow n, and magnetic head 13 is brought into contact with magnetic tape 3.

When drive changeover rod 80 is moved to the reverse position R, as shown in FIG. 8B, the pair of restricting pins 91 and 92 are moved within elongated holes 116 and 117. One restricting pin 91 moves out of notched portion 111 of pinch roller lever 102 and thereby restricts the forward movement of pinch roller lever 102 in the direction of arrow o, and pinch roller 11 is separated from capstan 9. The other restricting pin 92 is then moved into notched portion 112 of pinch roller lever 102 and pinch roller lever 103 moves forward in the direction of arrow p, so that pinch roller 12 is pressed against capstan 10.

As described above, pinch rollers 11 and 12 are selectively pressed against, or separated from, capstans 9 and 10 when drive changeover rod 80 is selectively moved between the normal position N and the reverse position R. Further, pinch rollers 11 and 12 are resiliently pressed against capstans 9 and 10 by the forces of torsion springs 107 and 108. Because both distal ends 107a and 108a of torsion springs 107 and 108 are pressed when driving member 60 is in the forward position, the changeover of pinch roller levers 102 and 103 between forward movement and backward movement is smoothly performed simply by applying or removing the restriction on pinch roller levers 102 and 103.

Figure 9A:
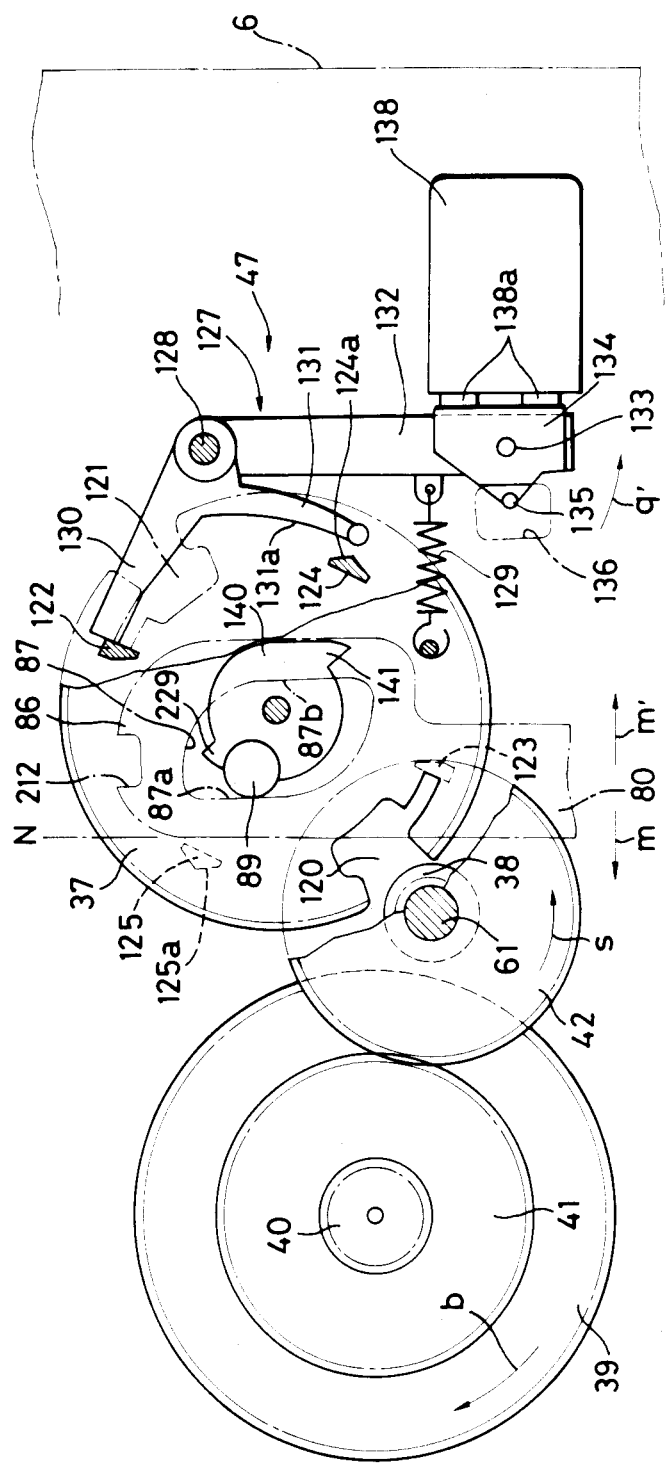
FIGS. 9A to 9D are plan views of the triggering mechanism of the mode changing mechanism.
Figure 9B:
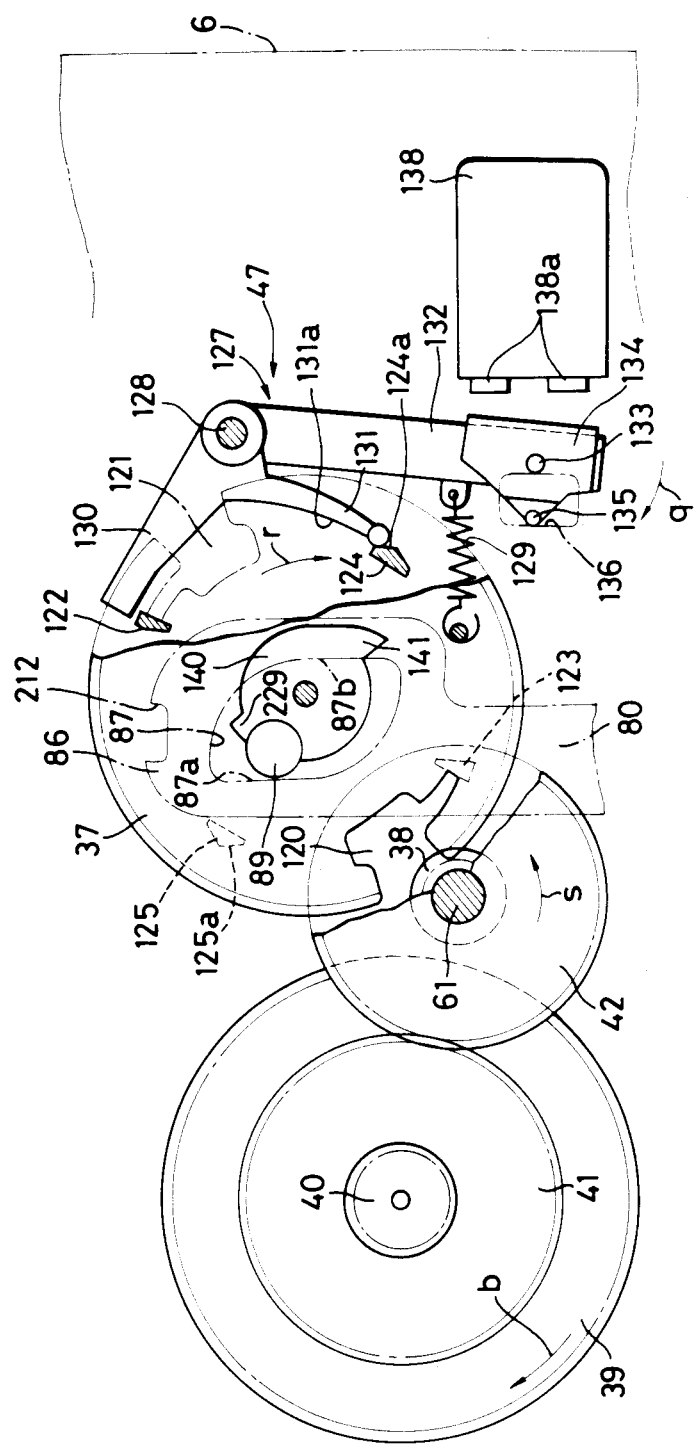

Triggering mechanism 47 is shown in detail in FIG. 1 and in FIGS. 9A to 10, in which triggering mechanism 47 mechanically provides an initial torque to partially toothless gear 37, which drives drive changeover rod 80 from the normal position N to the reverse position R, or vice-versa. In partially toothless gear 37, a toothless portion 120 in a normal position and a toothless portion 121 in a reverse position form an angle of 180° with each other, and a normal abutment pawl 122 and a reverse position abutment 123 are integrally formed with partially toothless gear 37 on the lower surface thereof and are located in the vicinity of toothless portions 121 and 120. On the lower face of partially toothless gear 37 a normal position cam element 124 and a reverse position cam element 125 are also integrally formed with partially toothless gear 37 and cam elements 124 and 125 form an angle of 90° with respective abutments 122 and 123. Cam elements 124 and 125 are of substantially triangular shape and have inclined planes 124a and 125a, respectively.

In the vicinity of partially toothless gear 37 and arranged beneath chassis 6, a triggering lever 127 is pivotted in the direction of arrows q and q' on a shaft 128 mounted in chassis 6 and is urged in the direction of arrow q by a return spring 129 affixed to chassis 6. Triggering lever 127 is molded from synthetic resin and includes a locking arm 130 that abuts abutments 122 and 123, a resilient arm 131 for pressing or following cam elements 124 and 125, and a support arm 132. Locking arm 130 and resilient arm 131 are formed in a so-called dog leg shape, so as to be in correspondence with abutment 122 and cam element 124 in the normal position, and in correspondence with abutment 123 and cam element 125 in the reverse position, and are arranged below partially toothless gear 37. More specifically, resilient arm 131 is arcuately shaped. An armature 134 is affixed to the distal end of support arm 132 and is arranged to freely pivot about shaft 133. As shown in FIG. 10, shaft 133 is somewhat barrel-shaped, so that an automatic core alignment function is provided to armature 134. Formed in the distal end of held arm 132 is an integrally molded pin 135, which is inserted in aperture 136 formed in chassis 6. Beneath chassis 6 is arranged a solenoid 138, which is of the armature pull-in type, pulling in armature 134 and keeping triggering lever 127 moved backward in the direction of arrow q'.

In operation of triggering mechanism 47, FIG. 9A shows a normal playback mode, in which armature 134 of support arm 132 is pulled by the core 138a and triggering lever 127 is held in rearward state in the direction of arrow q'. This causes abutment 122 in the normal position of partially toothless gear 37 to be engaged with the distal end of locking arm 130, and partially toothless gear 37 is locked in the normal position. Accordingly, toothless portion 120 in the normal position of partially toothless gear 37 is opposite driving gear 38, thereby leading to the normal drive of magnetic tape 3.

When in a normal run the tape comes to its end and end of tape detector 96 detects the stopping of rotation of reel base 7 as described above, an electric current is supplied to solenoid 138 for an instant. Then, the repulsive power of armature 134 is generated in core 138a and the pull-in of armature 134 is released, thereby causing triggering lever 127 to be moved forward in the direction of arrow q by return spring 129. This forward movement releases engagement of locking arm 30 and abutment 122, thereby releasing the locking of partially toothless gear 37. Simultaneously, inclined plane 124a of normal position cam element 124 is pressed by the distal end of resilient arm 131, thereby causing partially toothless gear 37 to be provided with an initial torque in the direction of arrow r and to be engaged with driving gear 38. Further, pin 135 of support arm 132 contacts the side of aperture 136, thereby stopping the forward movement of triggering lever 127 in the direction of arrow q.

Figure 9C:
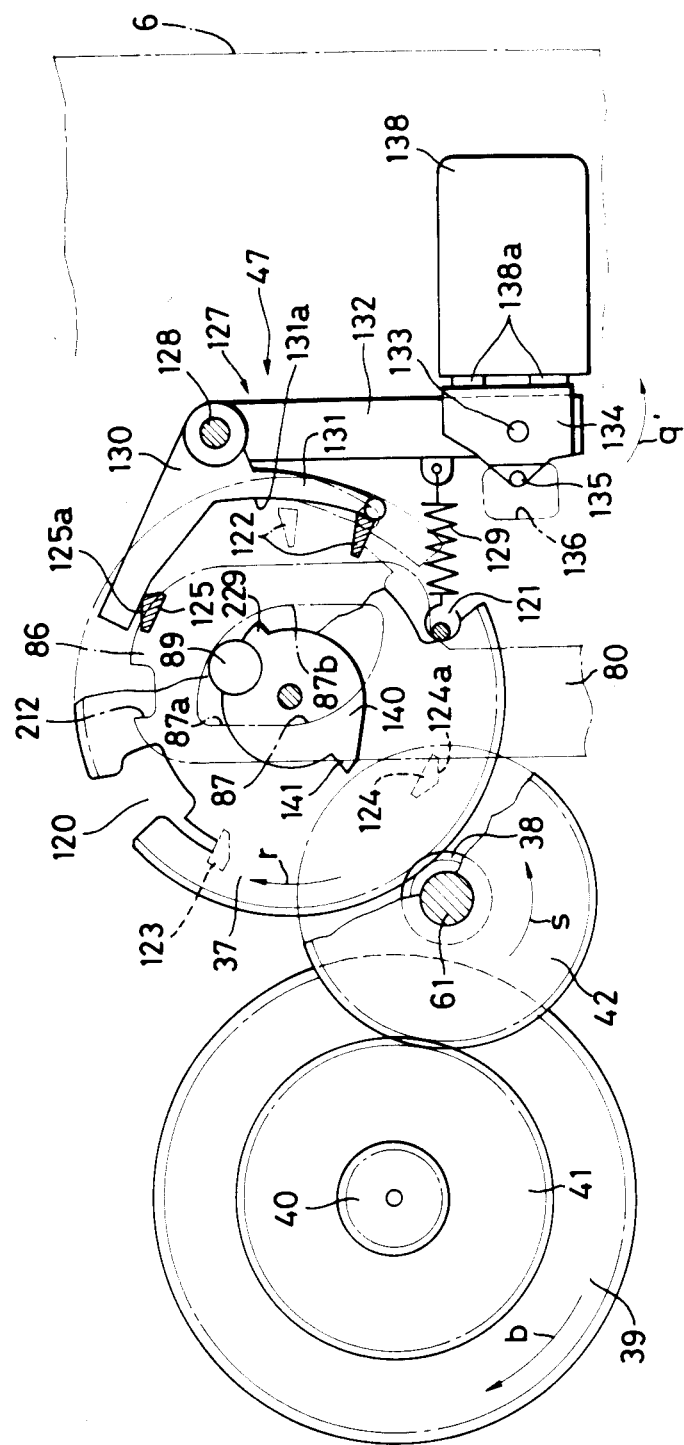

Driving gear 38 is always driven in the direction of arrow s because of the rotation of driven pulley 24 in the direction of arrow b through driving gear 41 and intermediate gear 42, so that partially toothless gear 37 is driven in the direction of arrow r by driving gear 38, as shown in FIG. 9C. When partially toothless gear 37 rotates through an angle of about 90°, abutment 122 is moved along inner surface 131a of resilient arm 131, thereby causing resilient arm 131 to be gradually tensioned and then triggering lever 127 to be moved backward in the direction of arrow q' against the force of return spring 129, so that armature 134 is pulled in again by magnet 138a of solenoid 138. Because armature 134 is mounted on support arm 132 with automatic core-alignment function provided by specially shaped shaft 133, armature 134 will be pulled in with certainty by solenoid 138, even though there may be some dimensional errors in triggering lever 127 due to moding tolerances, or if there is some mounting error of solenoid 138.

Figure 9D:
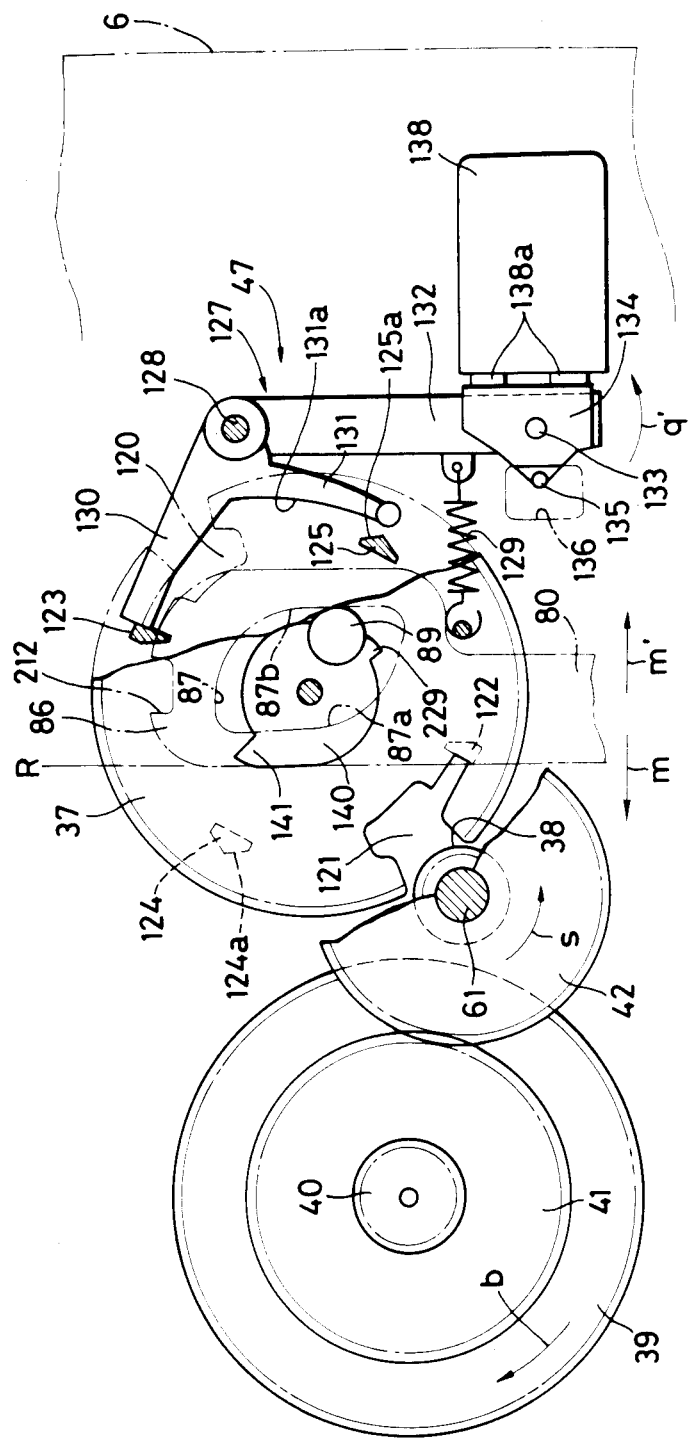

Partially toothless gear 37 is then rotated continuously in the direction of arrow r and, as shown in FIG. 9D, reverse toothless portion 121 is positioned in opposed relation to driving gear 38 just after gear 37 has rotated through an angle of 180°. Simultaneously, reverse position abutment 123 is engaged with the distal end of locking arm 130, and partially toothless gear 37 is locked in the reverse position. At his time, reverse position cam element 125 is positioned in the vicinity of the distal end of elastic arm 131. When partially toothless gear 37 is so turned, drive changeover rod 80 is driven from the normal position N to the reverse position R by operation of a cam mechanism that includes driving pin 89 of partially toothless gear 37 and yoke cam 87 of drive changeover rod 80, thereby causing a changeover from the normal playback mode to the reverse playback mode.

When the tape comes to its end in the reverse run mode, the same motion described above occurs and causes partially toothless gear 37 to be driven one-half turn from the reverse position to the normal position, and changeover rod 80 is driven from the reverse position R to the normal position N by such rotary motion. In triggering mechanism 47 triggering lever 127 accomplishes the locking and unlocking of partially toothless gear 37 in the normal position and in the reverse position by use of locking arm 130; accomplishes providing the initial torque to partially toothless gear 37 by use of resilient arm 131; accomplishes the backward movement of triggering lever 127 by using the rotation of partially toothless gear 37; and accomplishes retaining the triggering lever 127 in the rearmost state by using the support arm 132. Triggering lever 127 and the changeover mechanism 45 are used for providing the initial mechanical drive motion to partially toothless gear 37. As described in FIG. 6B, because pressing projection 85 presses one arm 69a of wire spring 69 as drive changeover rod 80 is moved to the normal position, movement in the direction of the reverse position R develops action by means of the reactive force of wire spring 69 on drive changeover rod 80. FIG. 9A then shows that driving pin 89 of partially toothless gear 37 is pressed in the direction of arrow m' by on the parallel cam profiles 87a of yoke cam 87 on drive changeover rod 80. This causes partially toothless gear 37 to be provided with initial rotary drive motion from drive changeover rod 80 because partially toothless gear 37 that was locked in normal position is released. On the other hand, as shown in FIG. 6C, when drive changeover rod 80 is shifted to the reverse position R it undergoes moving force in the direction of the normal position N by means of the reactive force of wire spring 69. Accordingly, as shown in FIG. 9D, driving pin 89 of partially toothless gear 37 is pressed in the direction of arrow m by the other of parallel cam profiles 87b of yoke cam 87 formed in drive changeover rod 80. This causes unlocking of partially toothless gear 37 in the reverse position and causes the initial turning effect from drive changeover rod 80 to be applied to partially toothless gear 37.

The operation of shut-off mechanism 48 is shown in FIG. 1 and FIGS. 11A-11D, in which shut-off mechanism 48 operates to develop shut-off motion at the time of the changeover of magnetic tape 3 from the reverse direction run to the normal direction run. Integrally molded on the upper surface of partially toothless gear 37 is a hub 140, and on the circumferential surface thereof is a ratchet 141 that is positioned to go behind locking pawl 123 along the turning direction of partially toothless gear 37. Shut-off lever 143 is pivotted on shaft 142, which is mounted in chassis 6, for free rotary movement between partially toothless gear 37 and locking plate 94. Driven pawl 144 projects from shut-off lever 143 on the side of partially toothless gear 37, driving pawl 145 contacts projection 94b of locking plate 94 and projection 147 having a pin 146 in its distal end, and all such elements are integrally molded with shut-off lever 143. Shut-off lever 143 is urged in the direction of arrow t by a torsion spring 148 that is stretched from chassis 6 to pin 146.

Figure 11A:
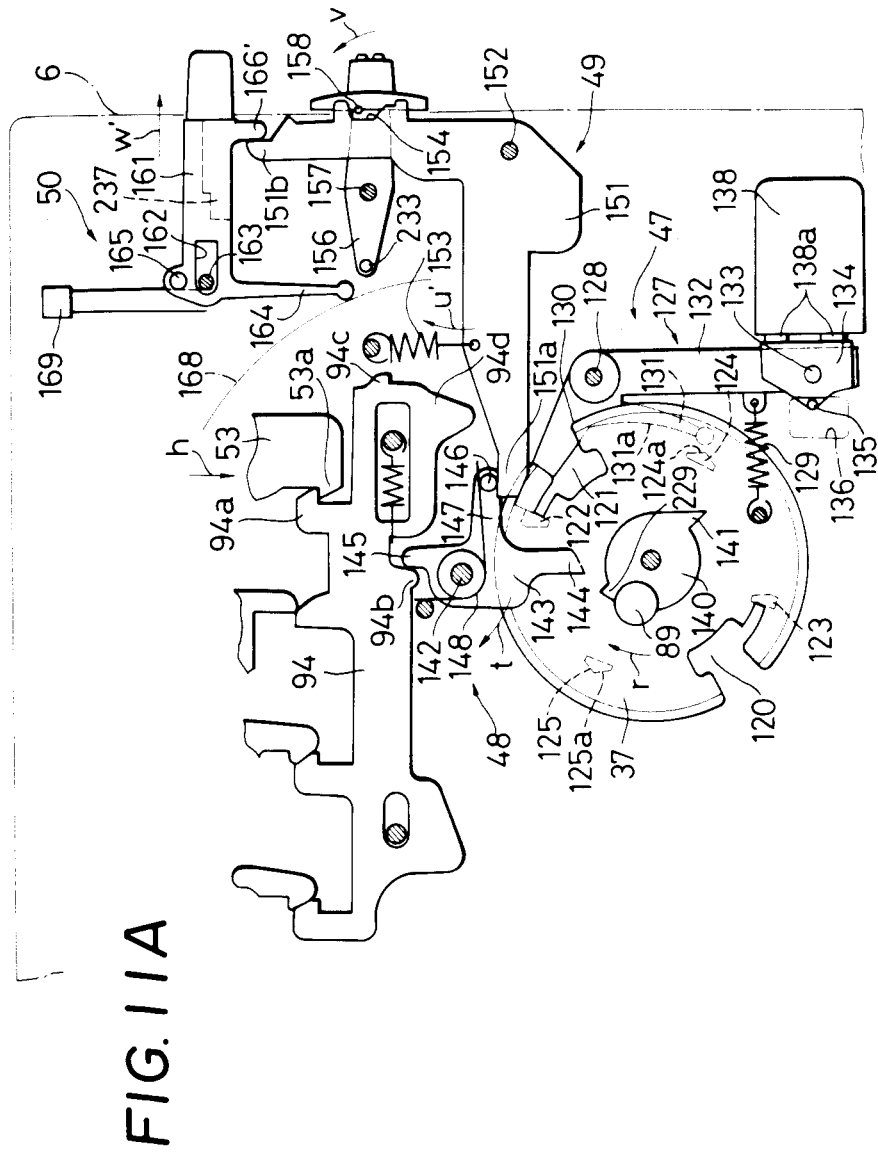
FIGS. 11A to 11D are plan views of a shut-off mechanism, a mode changing mechanism for changing over from an endless play mode, and the changeover mechanism.
Figure 11B:
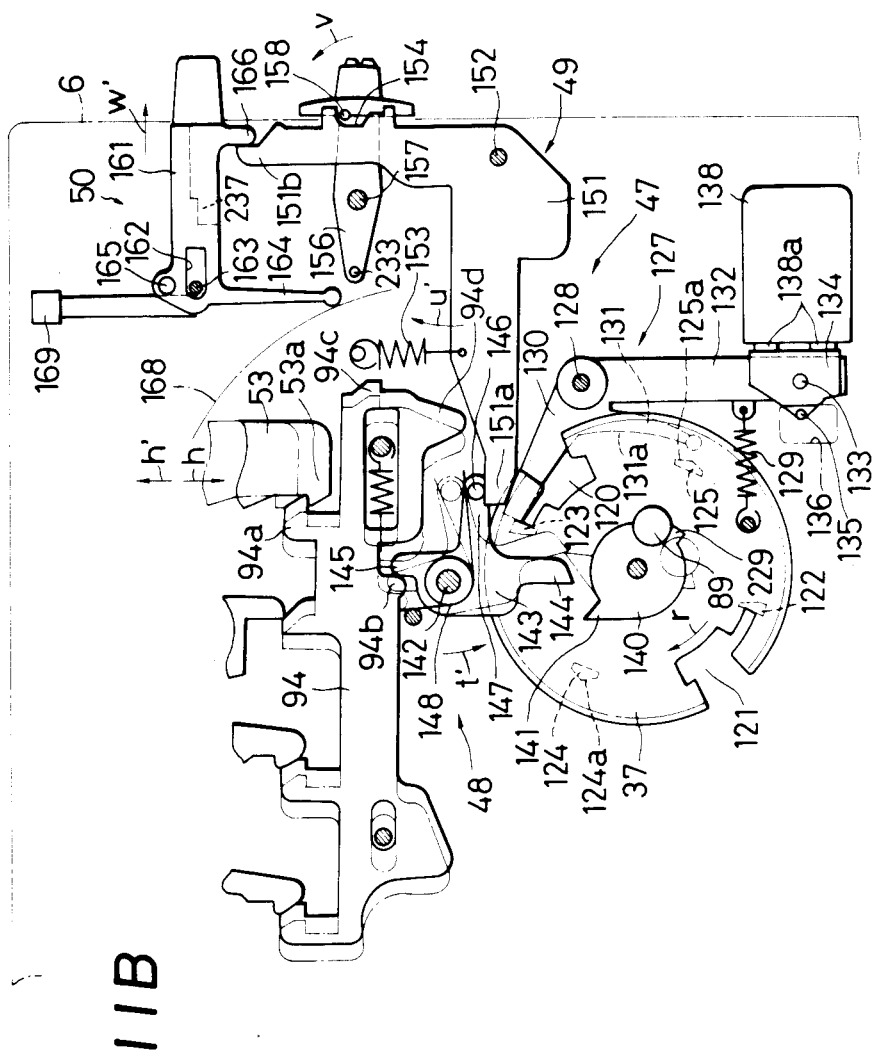

In the operation of shut-off mechanism 48, FIG. 11A shows a state in which partially toothless gear 37 is locked as described above in the normal position and when the tape ends in the normal direction run, partially toothless gear 37 is driven one-half turn in the direction of arrow r and is locked in the reverse position as indicated by the solid lines in FIG. 11B. At such time ratchet 141 of partially toothless gear 37 is located in the vicinity of driven pawl 144 of shut-off lever 143 and during the one-half turn of driving of partially toothless gear 37, ratchet 141 does not cooperate with shut-off lever 143 and is therefore, switched automatically from the normal direction run to the reverse direction run.

When a tape end in the reverse direction run is followed by the one-half turn of partially toothless gear 37 in the direction of arrow r from the reverse position, in that instant ratchet 141 of partially toothless gear 37 contacts driven pawl 144 of shut-off lever 143, as indicated in chain-dotted lines in FIG. 11B, and shut-off lever 143 is rotated in the direction of arrow t' against the force of torsion spring 148. This causes projection 94b of locking plate 94 to be pressed by driving pawl 145 of shut-off lever 143, and locking plate 94 is moved as indicated in chain-dotted lines, thereby releasing the engagement of locking pawl 53a of playback operating rod 53 with locking portion 94a. This results in the shut-off motion for automatic changeover from the reverse playback mode to the stop mode. Subsequently, partially toothless gear 37 is rotated in the direction of arrow r and is locked again in the normal position. Mode changing mechanism 49 is shown in detail in FIG. 1 and FIGS. 11A to 11D, in which beneath chassis 6, L-shaped mode changing lever 151 is pivotted on shaft 152, which is mounted on chassis 6, so as to be freely rotated in the direction of arrows u and u', and is urged by return spring 153 attached between changeover lever 151 and chassis 6. An end portion 151a of mode changeover lever 151 extends to the side of shut-off lever 143 and contacts pin 146 of shut-off lever 143. As a consequence, the rotation of shut-off lever 143 in the direction of arrow t is restricted by mode changing lever 151. A notched portion 154 is formed in another end of mode changing lever 151 and beneath chassis 6 in operating lever 156 is held in a right-angle relationship with the other end of mode changeover lever 151 so as to be freely pivotted in the direction of arrows v and v' on a shaft 157, which is mounted on chassis 6. Pin 158 is integrally molded with operating lever 156, and pin 158 engages with a notched portion 154 of mode changing lever 151.

Figure 11C:
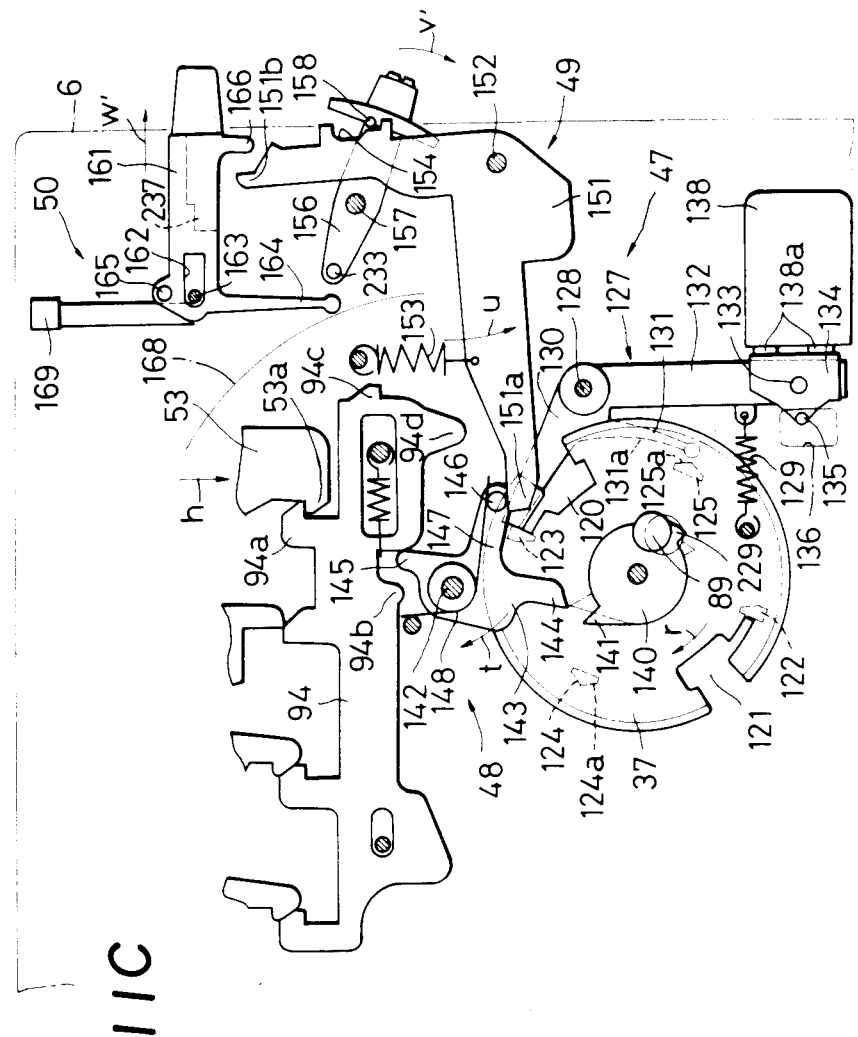

In the operation of mode changing mechanism 49, FIG. 11B illustrates a state in which when operation lever 156 is changed over in the direction of arrow v, mode changing mechanism 49 is switched to the one-cycle round-trip mode. That is, because pin 158 of operating lever 156 enters notched portion 154 of mode changing lever 151, mode changing lever 151 is rotated in the direction of arrow u' by return spring 153. As a consequence, pin 146 of shut-off lever 143 contacts one end 151a of mode changing lever 151, with shut-off lever 143 being held in the state shown in solid lines. This enables shut-off lever 143 to be changed over to a working state, so that shut-off motion is developed at the moment that partially toothless gear 37 is rotated from the reverse position to the normal position, as described above. In other words, in this one-cycle round-trip mode, the travel of magnetic tape 3 is automatically stopped after the reverse direction run that occur following the normal direction run. As shown in FIG. 11C, when operation lever 156 is changed over the direction of arrow v', pin 158 of operating lever 156 is moved from the inside of notched portion 154 of mode changing lever 151, thereby causing mode changing lever 151 to be rotated in the direction of arrow u against the force of return spring 153. Then, with one end portion 151a of mode changing lever 151 being shifted, shut-off lever 143 is rotated in the direction of arrow t by torsion spring 148, and driven pawl 144 thereof is moved away from being inside the locus of ratchet 141 of partially toothless gear 37. As a result, shut-off lever 143 is changed over into a non-functional state, and ratchet 141 passes through driven pawl 144 without contacting it, even if partially toothless gear 37 is rotated from the reverse direction position to the normal direction position. That is, in such a repeat play mode, magnetic tape 3 is continuously run by repeating the normal run and reverse run.

The changeover means 50 is shown in detail in FIG. 1 and FIGS. 11A to 11D in which manual changeover rod 161 is arranged beneath chassis 6 and is arranged for free reciprocal movement in the direction of arrows w and w' by interaction of elongated hole 162 and guide pin 163, which is mounted on chassis 6. A resilient arm 164, pin 165, and a projection 166 are molded integrally of synthetic resin to form manual changeover rod 161. By contact of the distal end of resilient arm 164 with an arcuately shaped, raised portion 168 of chassis 6, manual changeover rod 161 is moved in the direction of arrow w'. In addition, a switch 169 formed as a leaf switch is arranged in the vicinity of pin 165, and a projection 166 contacts the other end 151b of mode changing lever 151.

Figure 11D:
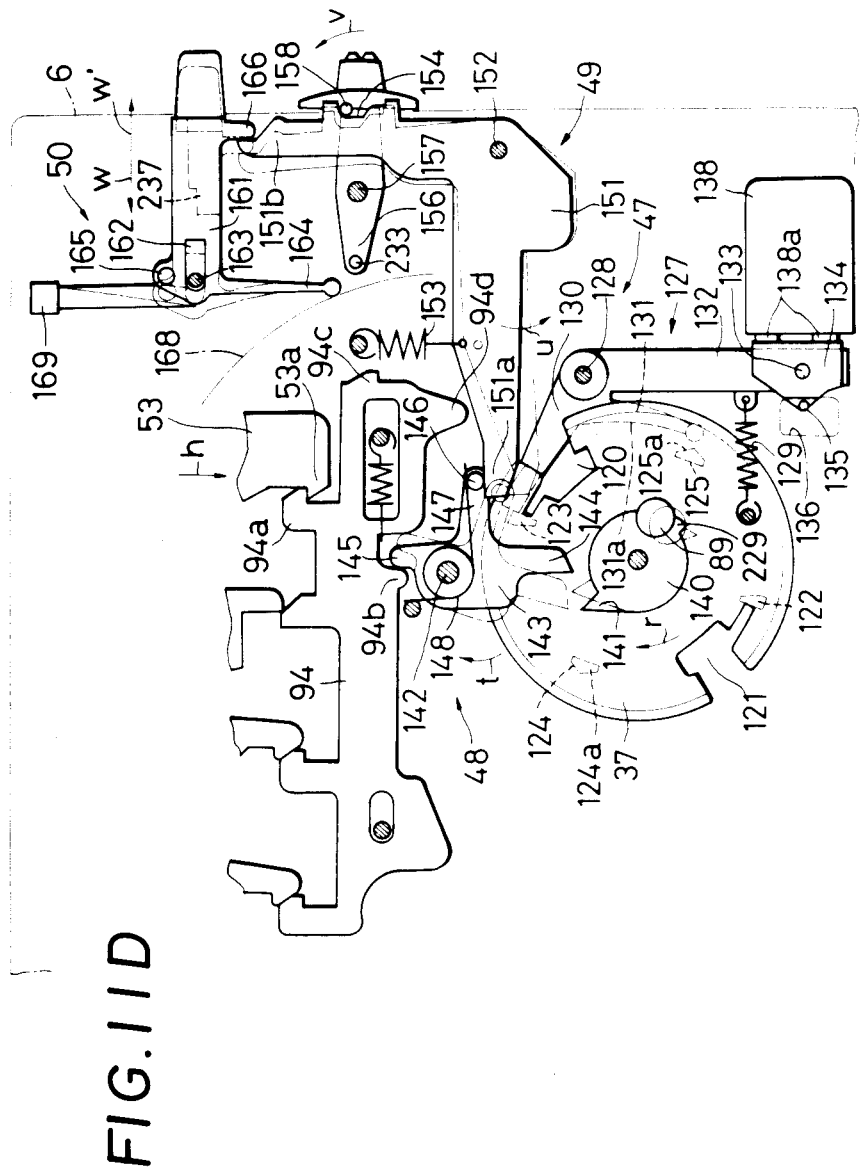

In the operation of changeover means 50, when manual changeover rod 161 is pushed in the direction of arrow w as indicated in chain-dotted lines in FIG. 11D, switch 169 is actuated by pin 165 of changeover rod 161. The solenoid 138 is instantaneously energized and triggering mechanism 47 is put into action as mentioned above, thereby starting rotation of partially toothless gear 37. In case mode changing mechanism 49 has been switched to a repeat mode at a time when the mechanism is as shown in FIG. 11C, there is no shut-off motion developed upon changeover from reverse run to normal run, so that changeover is selectively conducted between normal run and reverse run by depressing manual changeover rod 161. If mode changing mechanism 49 has been switched to a one-cycle round-trip mode, as shown in FIG. 11B, however, because shut-off motion is developed upon changeover from reverse run to normal run, mode changing mechanism 49 is shut-off, when manual changeover rod 161 is depressed at the time of reverse run.

By means of the changeover mechanism 50, however, when manual changeover rod 161 is pushed in the direction of arrow w when mode changing mechanism 49 has already been switched over to a one-cycle round-trip mode, as indicated in chain-dotted liens in FIG. 11D, the other end portion 151b of mode changing lever 151 is pressed by projection 166 of manual changeover rod 161, and mode changing lever 151 is forcibly rotated in the direction of arrow u against the force of return spring 153, as indicated in chain-dotted lines.

More specifically, mode changing mechanism 49 is forcibly switched over to a repeat mode, as shown in FIG. 11C, when changeover rod 161 is depressed, so that there is no shut-off motion developed upon changeover to be carried out selectively between normal run and reverse run.

Shut-off lever 143 is switched over to a non-functioning state by forcible rotation of mode changing lever 151 only while manual changeover rod 161 is being depressed, but because partially toothless gear 37 is rotated immediately when manual changeover rod 161 is depressed, there is no shut-off motion, but changeover to normal run has already been implemented by the time mode changing lever 151 is moved backward by releasing manual changeover rod 161.

The recording mechanism 172 is shown in detail in FIG. 1 and FIGS. 12 to 13C, in which record button 15 is affixed to one end of record initiating rod 180 arranged on the side of playback operating rod 53 beneath chassis 6. Record initiating rod 180 is constructed so as to be freely moved forward and backward in the directions of arrows A and A' by cooperation between elongated holes 183 and 184 and guide pins 181 and 182, which are mounted on chassis 6, and is moved backward and urged in the direction of arrow A' by return spring 185 stretched between record initiating rod 180 and the guide pin 163 that was used for changeover rod 161. Record initiating rod 180 has a projection 186, which is engaged with notched portion 53b provided in playback operating rod 53, and a triangular prism-shaped lock pin 187 is arranged adjacent and above projection 186 of record initiating rod 180.

Mounted beneath chassis 6 are two detecting rods 190 and 191 for the respective A side and B side of the tape cassette 4, which detect independently of each other the presence of the two tabs 173 and 174 for the A side and B side of cassette 4, are arranged crossing at right angles to playback operating rod 53 and record initiating rod 180, respectively. Detecting rod 190 for the A side is constructed for free reciprocal movement in the directions of arrows B and B' by cooperation between elongated holes 194 and 195 and guide pins 192 and 193, respectively, which are mounted on chassis 6, while detecting rod 191 for the B side is constructed for free reciprocal movement in the directions of arrows C and C' by being arranged beneath detecting rod 190 and having a guide pin 193 cooperate with an elongated hole 196. Both detecting rods 190 and 191 are moved backward and mutually urged in the directions of arrows B' and C' by tension spring 197 that is stretched between these detecting rods. Detecting levers 200 and 201 are held so as to be freely rotated on shafts 198 and 199, which are mounted on chassis 6, and are connected to the end sides of detecting rods 190 and 191 by pins 202 and 203, respectively. Detecting levers 200 and 201 possess detecting projections 200a and 201a projecting above chassis 6, and rectangular holes 203 and 205 are formed in the portion where both detecting rods 190 and 191 are placed. Locking pawl 206 comprising a projection is formed on the other end side of detecting rod 190 of the A side, while locking pawl 208 comprising a projection is formed in the portion of hole 207 on one end side of detecting rod 191 for the B side. Lock pin 187 of record initiating rod 180 is inserted in hole 207 from the lower part and is located between two locking pawls 206 and 208.

Beneath chassis 6, a controlling lever 210 is held so as to be freely pivotted in the directions of arrows D and D' on shaft 56 of connecting lever 55, and a pin 211 mounted on one end portion of controlling lever 210 is inserted in rectangular holes 204 and 205 of both detecting rods 190 and 191. In the other end portion of controlling lever 210 is formed a pawl 210a, which is engaged with notched portion 212 formed in the distal end of arm 86 of drive changeover rod 80, as shown in FIG. 14A.

Figure 14A:
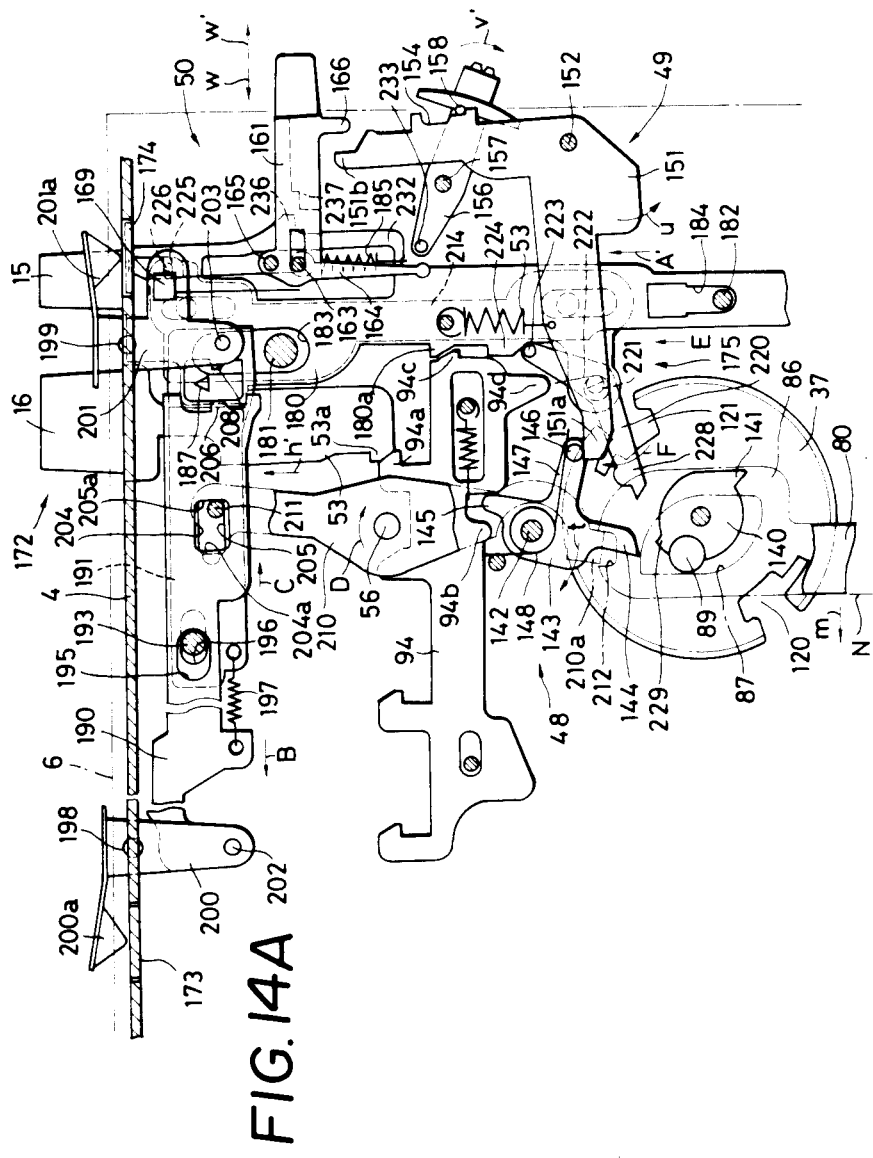
FIGS. 14A to 14F are plan views of the shut-off mechanism operative only during the recording mode.

FIG. 14A shows drive changeover rod 80 in the normal position N being driven by the shift of drive changeover rod 80 to the normal position in which controlling lever 210 is pivotted in the direction of arrow D. One of the parallel rims 205a of rectangular hole 205 in detecting rod 191 for side B is pressed by pin 211 of controlling lever 210, and detecting rod 191 is retained in a unlocking position where it is moved forward in the direction of arrow C against the force of tension spring 197. This causes locking pawl 208 of detecting rod 191 to be separated from lock pin 187 of record initiating rod 180 and, because detecting rod 190 for side A is not restricted by pin 211 of controlling lever 210, it is controlled in a state permitting its reciprocal movement between the unlocking position, in which it is moved forward in the direction of arrow B, and the locking position, in which it is moved backward in the direction of arrow B'.

Figure 13A:
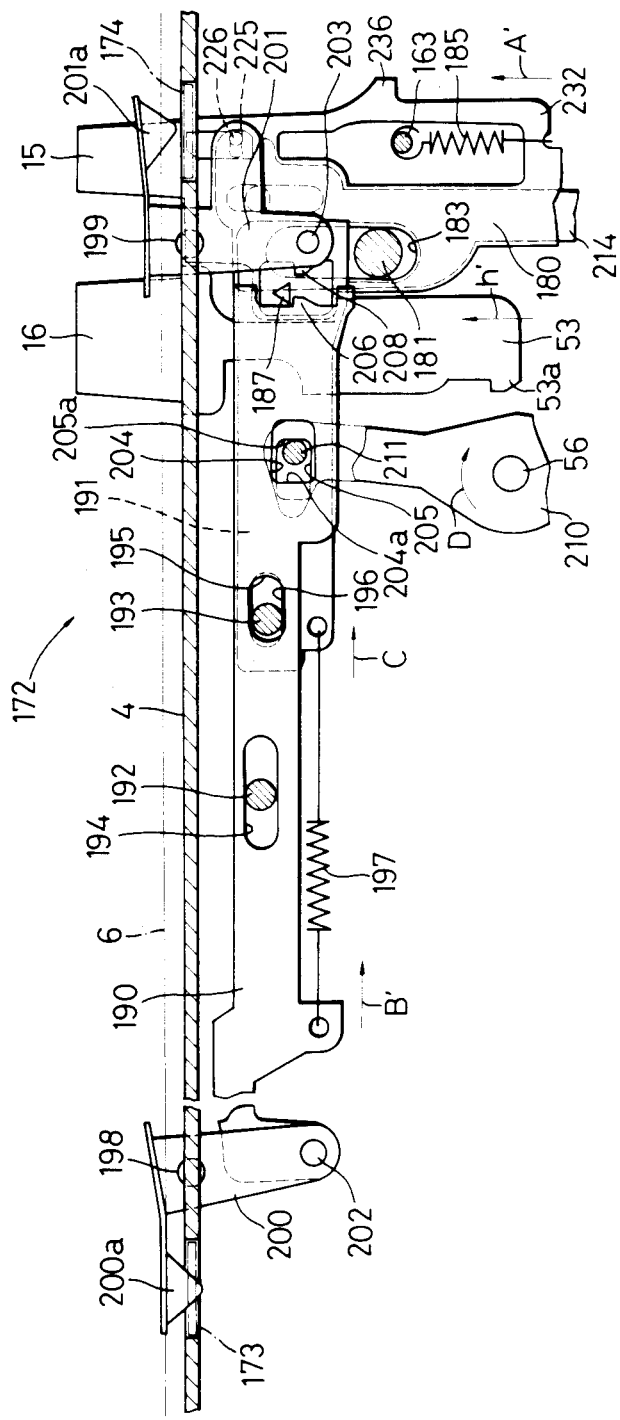

When drive changeover rod 80 is located at normal position N, detecting rod 190 for side A independently detects tab 173 for side A of cassette 4. In the case where tab 173 for side A has been removed, as shown in FIG. 13A, because detecting projection 200a of detecting lever 200 is not restricted, detecting rod 190 is moved backward to a locking position in the direction of arrow B' by tension spring 197. This causes locking pawl 206 of detecting rod 190 to be engaged with lock pin 187 of record initiating rod 180, so that record initiating rod 180 is locked at the position of backward movement in the direction of arrow A'. Consequently, record button 15 cannot be pressed and, thus, there is no possibility of a changeover to the record mode.

Figure 13C:
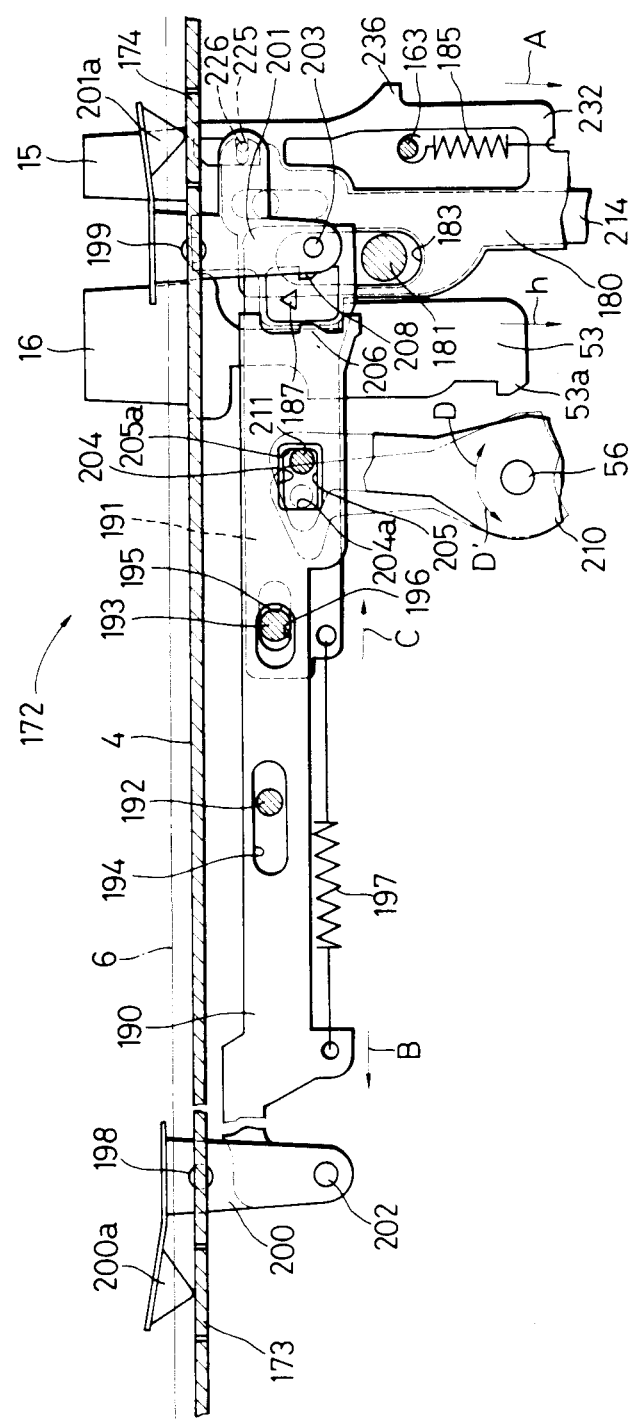

If there is a tab 173 for side A of cassette 4, as shown in FIG. 13C, because detecting projection 200a of detecting lever 200 is restricted at tab 173, detecting lever 200 is turned around, and detecting rod 190 is moved forward to an unlocking position in the direction of arrow B against the force of tension spring 197. This allows locking pawl 206 of detecting rod 190 to be separated from locked pin 187 of record initiating rod 180, so that locking of record initiating rod 180 at a rearward position is released. Consequently, by depressing record button 15, record initiating rod 180 is moved forward in the direction of arrow A, thereby enabling changeover to a record mode.

FIG. 13B shows drive changeover rod 80 having been shifted to a reverse position R and, because controlling lever 210 is swung in the direction of arrow D', one of the parallel rims 204a of rectangular hole 204 of detecting rod 190 for side A is pressed by pin 211 of controlling lever 210, and detecting rod 190 is retained at an unlocking position, in which it is moved forward in the direction of arrow B against the force of tension spring 197. Because detecting rod 191 for side B is not restricted by pin 211 of controlling lever 210, it is controlled in a state that it can be moved reciprocally between an unlocked position, in which it is moved forward in the direction of arrow C, and a locked position, in which it is moved backward in the direction of arrow C.

Accordingly, when drive changeover rod 80 is located in reverse position R, detecting rod 191 for side B independently detects tab 174 for the side B face of cassette 4. When tab 174 for side B has been removed, detecting rod 191 is moved backward to a locked position in the direction of arrow C' by tension spring 197, which causes locking pawl 208 of detecting rod 191 to be engaged with lock pin 187 of record initiating rod 180, so that record initiating rod 180 is locked at a rearward position in the direction of arrow A'.

When tab 174 for side B is present, as shown in FIG. 13C, detecting lever 201 is turned around and is moved forward to an unlocked position in the direction of arrow C against the force of tension spring 197. This causes locking pawl 208 of detecting rod 191 to be separated from lock pin 187 of record initiating rod 180, so that locking of record initiating 180 in the rearward position is released. Therefore, when record button 15 is depressed, record initiating rod 180 is moved forward in the direction of arrow A, thereby enabling changeover to the record mode.

Even if it is not possible to record at the normal run or reverse run due to the absence of tabs 173 and 174 for side A or side B of cassette 4, shifting changeover rod 80 selectively to reverse position R or normal position N without removing and turning cassette 4 enables the record operation in reverse run or normal run only when there are tabs 174 and 173 for side A face or side B under the aforementioned state. It should be noted, in addition, that a shift of drive changeover rod 80 can be attained by operation of changeover means 50, as described hereinabove.

Figure 14B:
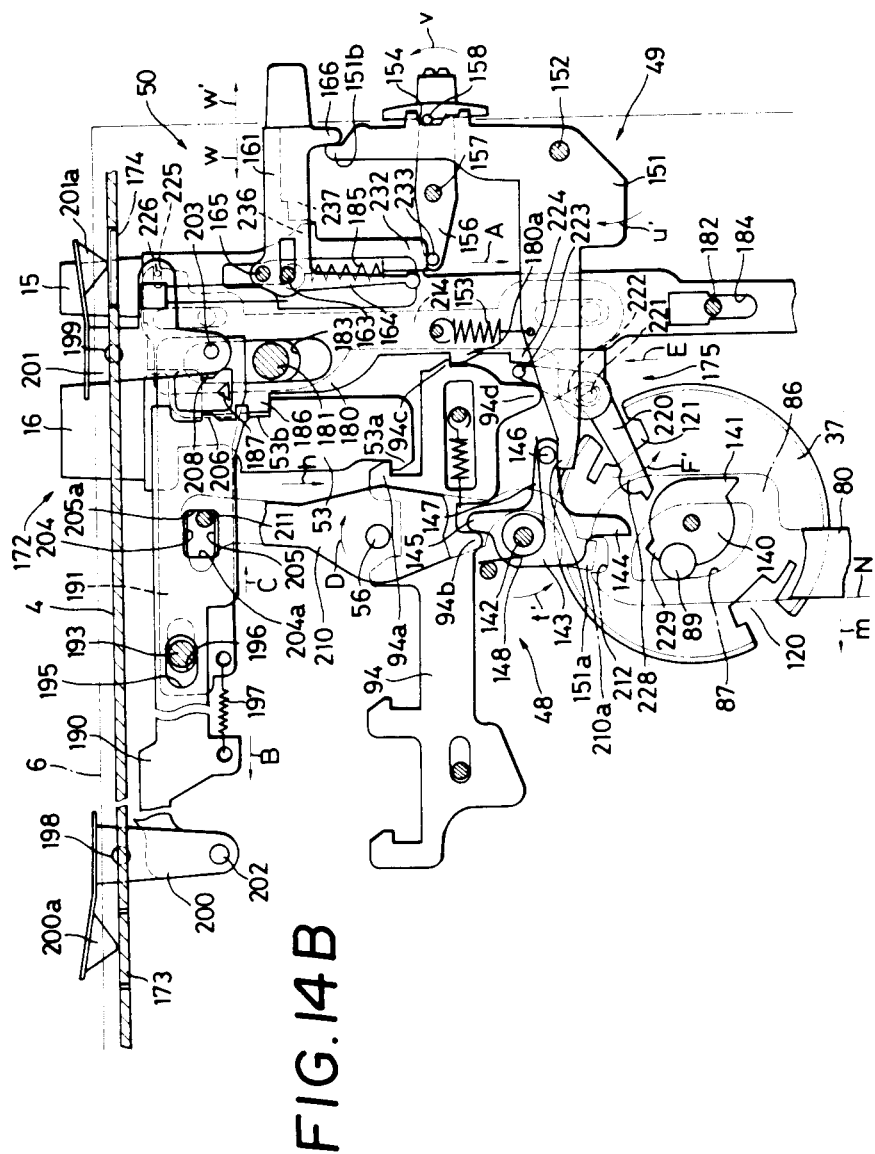
Figure 14C:
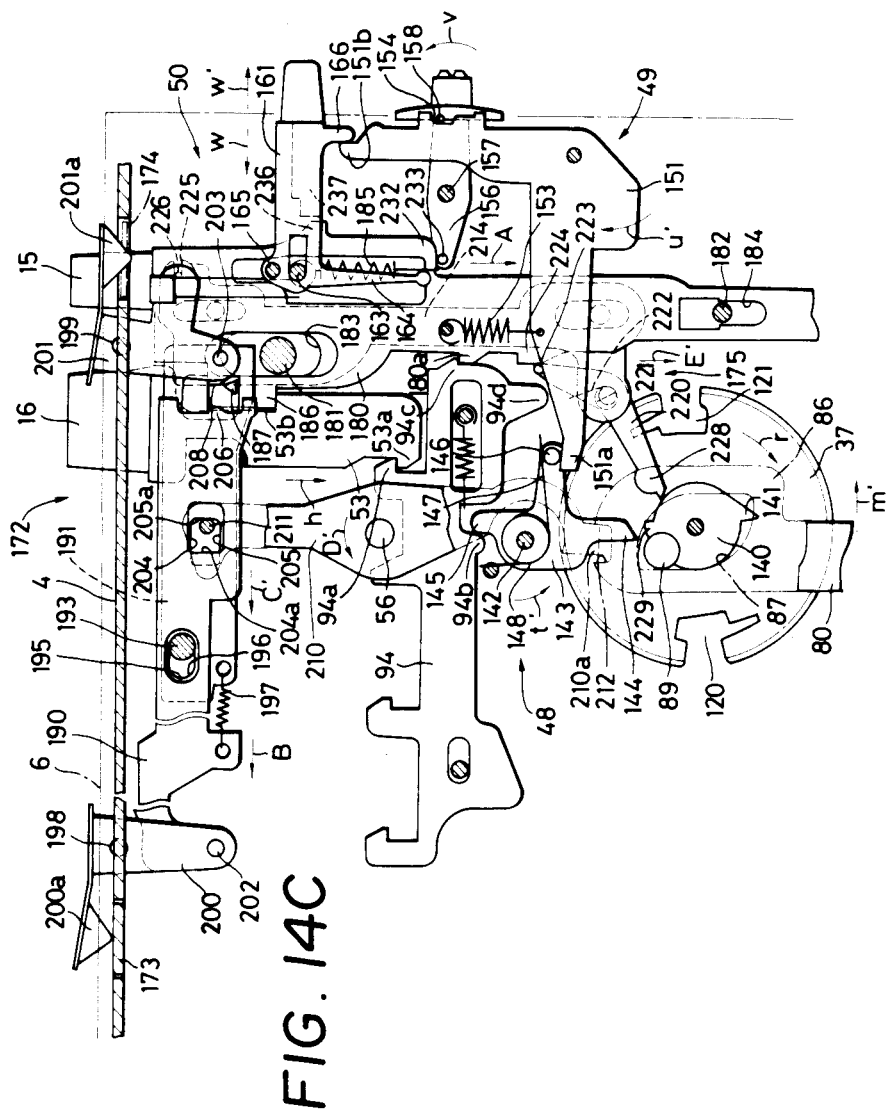
Figure 14D:
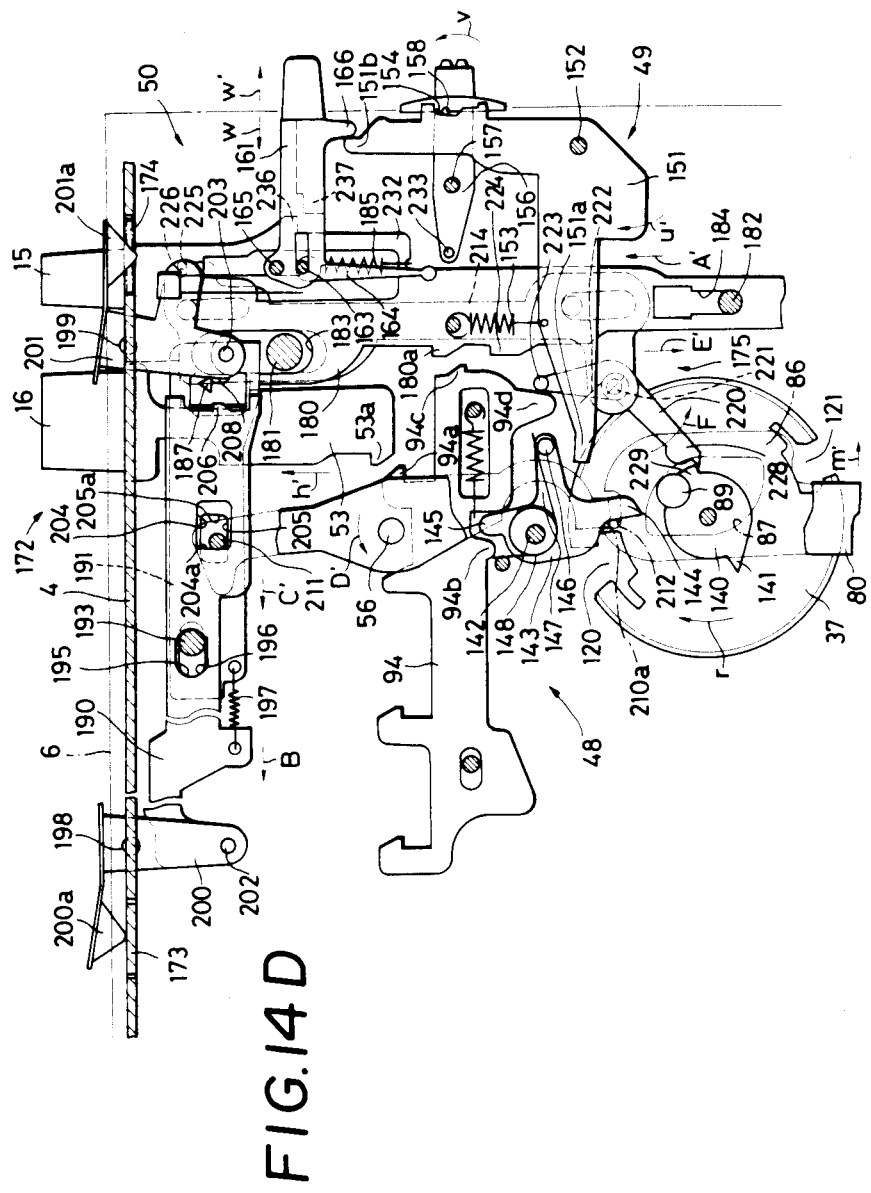
Figure 14E:
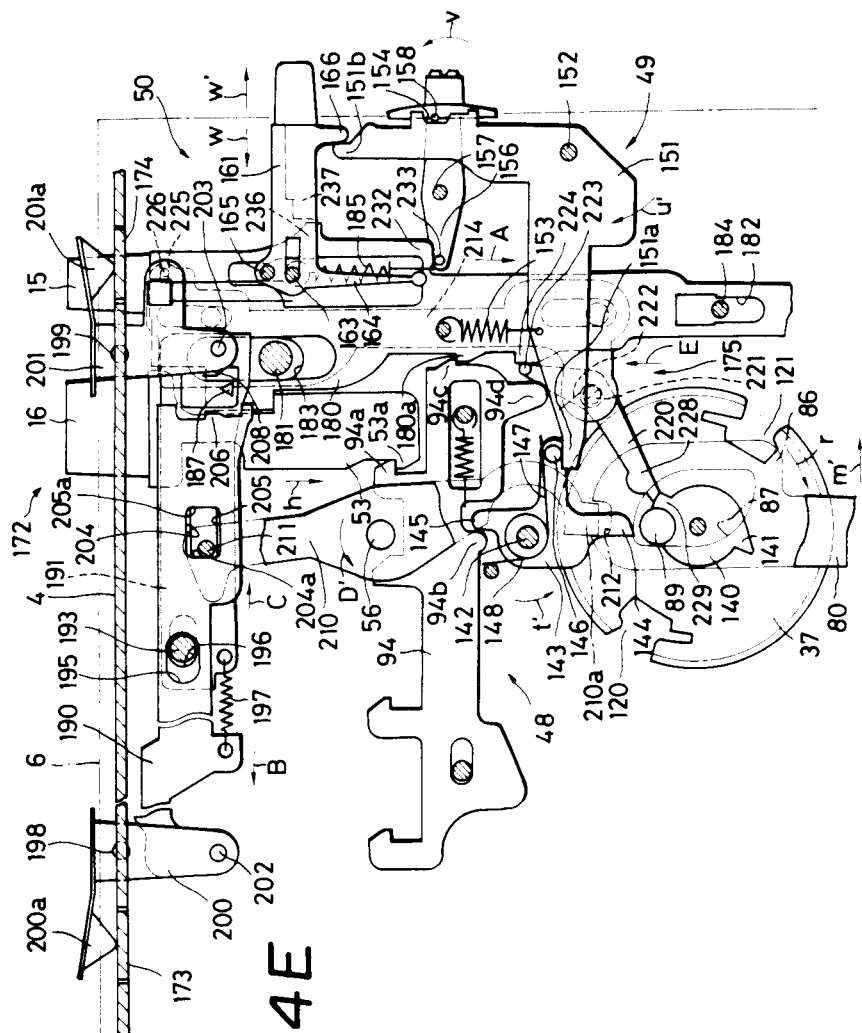
Figure 14F:
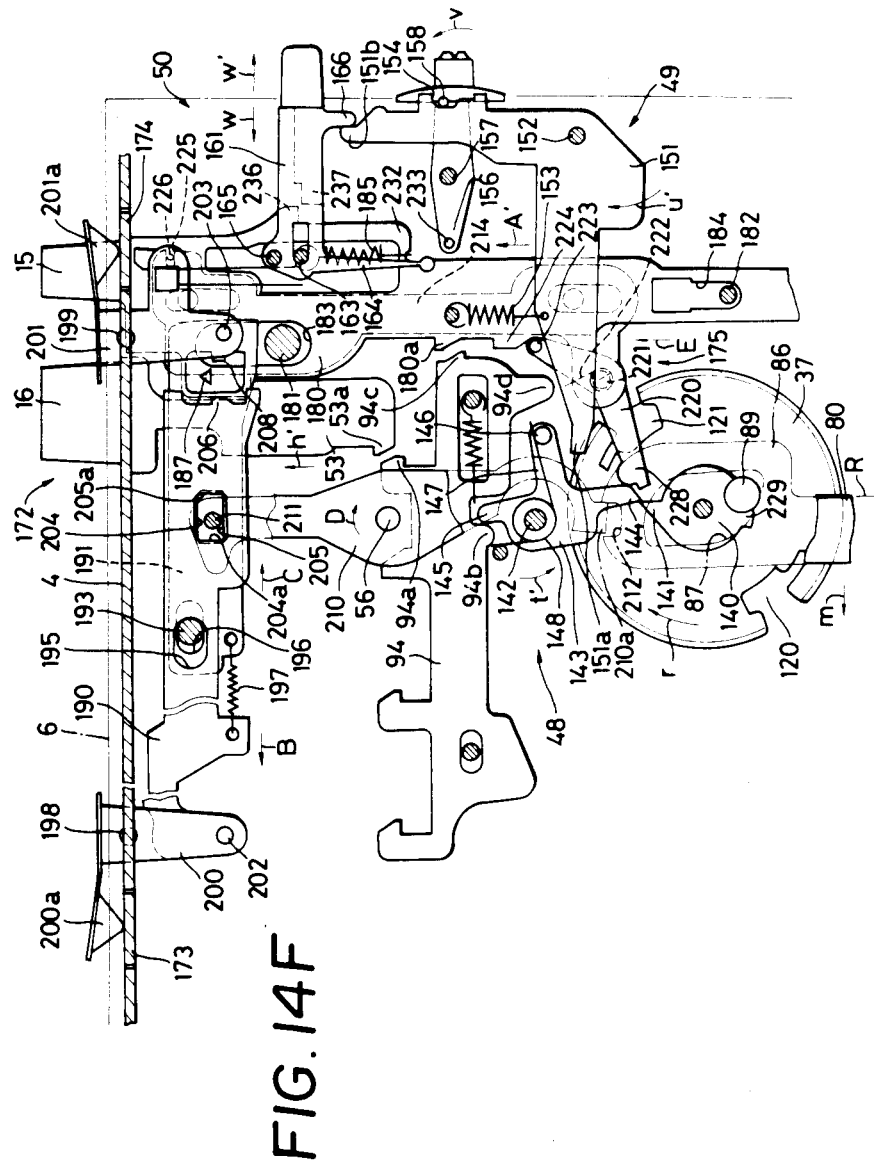

Shut-off mechanism 175 is shown in detail in FIGS. 1, 12, and FIG. 14F, in which a shut-off changeover rod 214 of shut-off mechanism 175 is laid over and arranged beneath record operating rod 180, and is constructed for free reciprocal movement in the directions of arrows E and E' by cooperation between elongated holes 217, 218, and 219 and guide pins 215 and 216, which are mounted on record initiating rod 180, and guide pin 181, respectively. In the distal end of shut-off changeover rod 214 a shut-off lever 220 is retained so as to be freely turned in the directions of arrows F and F' on shaft 221 of shut-off lever 220 and is urged in the direction of arrow F by torsion spring 222. In shut-off lever 220 is formed a pin 223, which contacts a projection 224 formed in record initiating rod 180, a U-shaped notch 225 is formed in the other end portion of shut-off changeover rod 214, and a pin 226 is formed in detecting lever 201 of detecting rod 191 for the side B face and is engaged with notch 225 by penetrating elongated hole 227 in record operating rod 180. As a consequence, shut-off changeover rod 214 is constructed so as to be reciprocally moved in the directions of arrows E and E' by the turning of detecting lever 201, that is, the reciprocal motion of detecting rod 191 caused by the presence of tab 174 for side B.

In the operation of shut-off mechanism 175, FIG. 14A shows a state in which drive changeover rod 80 is at the normal position N in a stop mode and in which tab 173 for side A is present, but tab 174 for side B is not present. Because drive changeover rod 80 remains at the normal position N, controlling lever 210 is pivotted in the direction of arrows D, thereby causing detecting rod 190 for side A to be controlled so as to be freely reciprocated and, because tab 173 for side A is present, detecting rod 190 is moved forward to an unlocking position in the direction of arrow B, thereby enabling changeover to a record mode.

When record button 15 is depressed, as shown in FIG. 14B, record initiating rod 180 is moved forward in the direction of arrow A, leading to changeover from a stop mode to a record mode. Because projection 186 of record initiating rod 180 pushes notched portion 53b of playback operating rod 53 at such time, playback operating rod 53 is also moved forward in the direction of arrow h, so that locking pawl 53a in engaged with locking pawl 94a of locking plate 94 and is then locked. Record initiating rod 180 is also engaged with locking pawl 94c of locking plate 94 and is then also locked at the position of forward movement, which results in a normal record mode, just as the normal playback mode described hereinabove.

When the magnetic tape 3 comes to the end in the normal run of a normal record mode, partially toothless gear 37 is rotated in the direction of arrow r, as shown in FIG. 14C, thereby leading to the start of a shift of changeover rod 80 from normal position N to reverse position R. At that moment, controlling lever 210 is pivotted in the direction of arrow D', and detecting rod 191 for side B is in turn controlled so as to be freely reciprocated. Detecting projection 201a of detecting lever 201 is, therefore, not restricted because of the absence of tab 174 for side B, and detecting lever 201 is turned around by the backward movement of detecting rod 191 in the direction of arrow C'. The turn-around of detecting lever 201 causes shut-off changeover rod 214 to be moved backward in the direction of arrow E', and driven pawl 228 in the distal end of shut-off lever 220 to be moved into the turning locus of driving pawl 229 formed in partially toothless gear 37. In other words, the shut-off mechanism 175 for the record mode is switched over to the functional state. Rotation of partially toothless gear 37 in the direction of arrow r, as showing in FIG. 14D, causes driving pawl 229 to contact driven pawl 228 of shut-off lever 220 and shut-off lever 220 is turned around in the direction of arrow F against the force of torsion spring 222. With projection 94d of locking plate 94 pressed by pin 223 of shut-off lever 220 locking plate 94 is shifted, thereby causing record operating rod 180 to be unlocked, as well as playback operating rod 53 to be unlocked, thus, resulting in a stop mode. In this way, when there is no tab 174 for side B, upon changeover from normal run to reverse run, shut-off motion is automatically developed at the time of such changeover.

As shown in FIG. 14E, when there is a tab 174 for side B, even if detecting rod 191 for side B is moved freely forward and backward at the time of changeover from normal run to reverse run, shut-off changeover rod 214 is kept in the state of forward movement in the direction of arrow E, because detecting projection 201a of detecting lever 201 is restricted by tab 174 and detecting lever 201 is not turned around. In other words, driven pawl 228 of shut-off lever 220 is moved away from inside the turning locus of driving pawl 229 of partially toothless gear 37, so that shut-off mechanism 175 is switched to a non-functioning state. Even when partially toothless gear 37 is rotated in the direction of arrow r, driving pawl 229 does not contact driven pawl 228 but passes by it, resulting in no shut-off motion being developed. That is, changeover is conducted from normal run to reverse run while staying in record mode, thereby leading to reverse record in continuation from normal record.

Thereafter, when the end of the tape is reached during reverse run of a reverse record mode, shut-off lever 142 is driven as in FIG. 14F and is then switched automatically from a reverse record mode to a stop mode in the same manner as shut-off after reverse playback, as described hereinabove. In other words, shut-off after reverse recording is used jointly by shut-off mechanism 48 after reverse playback.

As shown in FIG. 14A, when record initiating rod 180 is being moved backward to the rearward position in the direction of arrow A', shut-off lever 220 of shut-off mechanism 175 for recording is turned around in the direction of arrow F by torsion spring 222, because it is not pressed by projection 224 of record initiating rod 180. Even though shut-off lever 220 is put into the repeat mode, which was described hereinabove, in a playback mode shut-off lever 220 is not driven by driving pawl 141. When switched to a record mode, as shown in FIG. 14B, pin 223 of shut-off lever 220 is pressed by projection 224 of record initiating rod 180 and is then turned around in the direction of arrow F', and is further inserted in the turn locus of driving pawl 229 when there is no tab 174 for side B, as shown in FIG. 14C.

In a record mode, as described above, at the time of changeover from normal run to reverse run, shut-off is automatically conducted so long as there is no tab 174 for side B, and changeover is automatically carried out to reverse run when there is a tab 174 for side B.

Mode changing mechanism 49 in a record mode is shown in detail in FIG. 1 and FIGS. 14A to 14F, in which pin 233 is integrally molded at the distal end of operating lever 156 of mode changing mechanism 49, and record initiating rod 180 is provided with a pressing portion 232 comprising a projection that presses pin 233. More specifically, operating lever 156 is arranged crossing at right angles with record initiating rod 180, and the distal end of operating lever 156 is inserted in the moving locus of pressing portion 232 of record initiating rod 180.

By the above-described mode changing mechanism 49, when record initiating rod 180 is in the rearward position, as showing in 14A, pin 233 of operating lever 156 is not pressed by pressing portion 232 of record initiating rod 180, so that changeover between a round-trip mode and a continuous mode can be achieved in a playback mode by the changeover operating operating lever 156, as described hereinabove. When switched to a record mode, as shown in FIG. 14b, however, pin 233 of operating lever 156 is pressed by pressing portion 232 of record initiating rod 180, and operating lever 156 is forcibly turned around in the direction of arrow V. Accordingly, even when mode changing mechanism 49 is switched to repeat mode at the time of changeover to a record mode, it forcibly becomes a round-trip mode in a record mode when record initiating rod 180 is moved forward. In other words, it is shut-off by all means after record in the reverse run and is never switched from reverse run again to normal run.

Changeover means 50 is shown in detail in FIG. 1 and in FIGS. 14A to 14F, in which projection 237 is integrally molded with manual changeover rod 161 of changeover mechanism 50, and a restricting portion 236 comprising a projection that contacts projection 237 is provided in record initiating rod 180. That is, manual changeover rod 161 is arranged crossing at right angles with record initiating rod 180, and restricting portion 236 of record initiating rod 180 is constructed so as to be inserted in the moving locus of projection 237 of manual changeover rod 161.

By operation of changeover mechanism 50, when record initiating rod 180 is in the rearward position, as showing in FIG. 14A, projection 237 of manual changeover rod 161 is not retained by restricting portion 236 of record initiating rod 180, so that in a playback mode normal run and reverse run can be selectively changed over upon occasion by letting manual changeover rod 161 be moved forward in the direction of arrow W, as described hereinbelow. When switched to a record mode, as shown in FIG. 14B, however, restricting portion 236 of record initiating rod 180 is inserted in the moving locus of projection 237 of manual changeover rod 161. In other words, manual changeover rod 161 is constrained to a state in which it is moved backward in the direction of arrow W', which represents a state of changeover inability. Consequently, in a record mode there is no possibility of selective changeover between normal run and reverse run.

Figure 15:
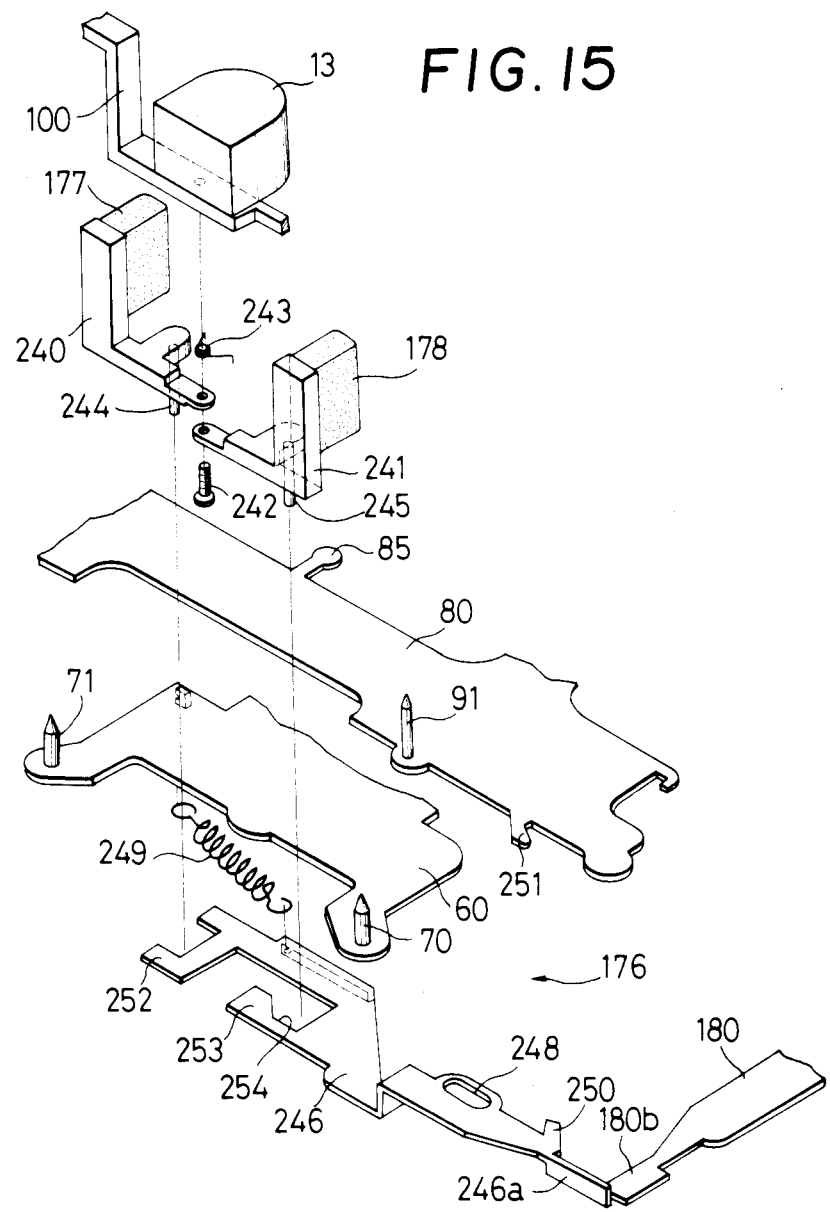
FIG. 15 is an exploded, perspective view of an erase head moving mechanism.

The erase head moving mechanism 176 is shown in detail in FIG. 1 and in FIGS. 15 to 16B, in which erase heads 177 and 178 for normal run and reverse run are mounted on erase head holding levers 240 and 241, respectively, which are pivottably secured to head arm 100 on shaft 242. Erase head levers 240 and 241 are urged by torsion spring 243 in a direction so as to be separated from magnetic tape 3. In addition, pins 244 and 245 are formed integrally with respective erase head levers 240 and 241. On the side of changeover rod 80, driving lever 246 is constructed for free reciprocal motion in the direction of arrows G and G' and to be freely turned around in the directions of arrows H and H' by cooperation between elongated hole 248 and guide pin 247, which is mounted on chassis 6. Driving lever 246 is moved forward in the direction of arrow G by tension spring 249 stretched from driving lever 246 to driving rod 60 and on the side of end portion 246b of driving lever 246 is formed projection 250, which is intended for contact with a projection 251 formed in drive changeover rod 80. A pair of L-shaped pressing projections 252 and 253 are formed in the other end portion of driving lever 246 extended below erase heads 177 and 178, with the side of one pressing projection 253 having a groove 254, and an end portion 246a of driving lever 246 is pressed by end portion 180b of record initiating rod 180.

Figure 16A:
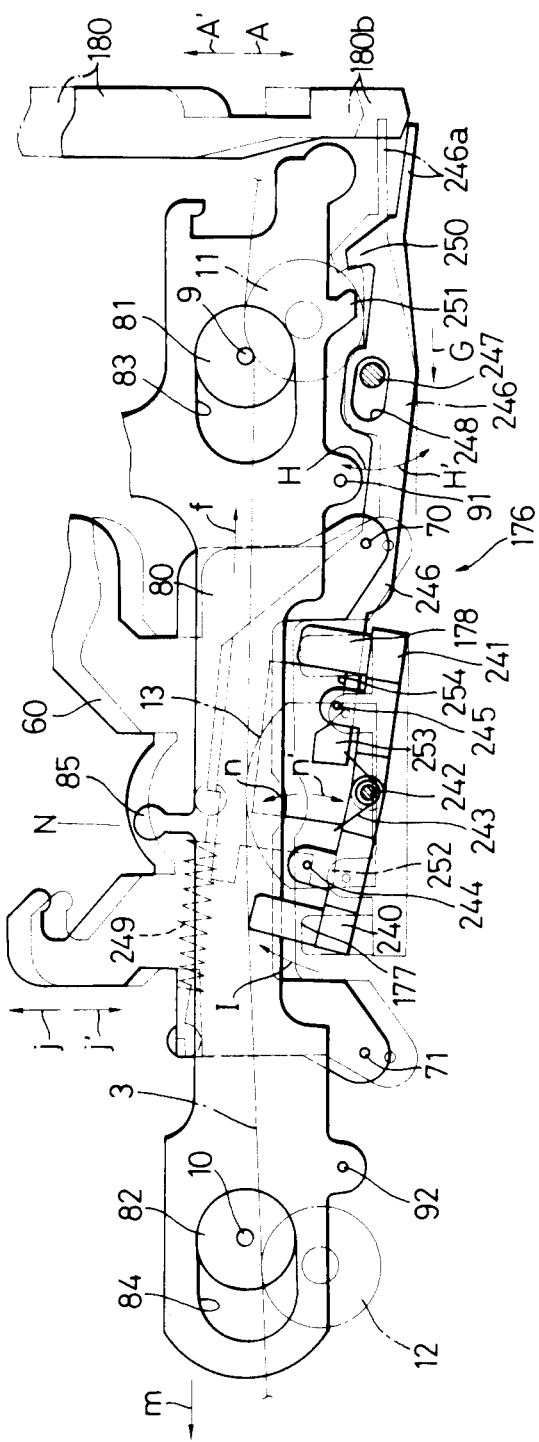

In the operation of erase head driving mechanism 176, when record initiating rod 180 is moved forward in the direction of arrow A and is then switched to a record mode as indicated in chain-dotted lines and solid lines in FIG. 16A, end portion 246a of driving lever 246 is pressed by end portion 180b of record initiating rod 180, and driving lever 246 is then turned around in the direction of arrow H. Because driving lever 246 has been moved forward in the direction of arrow G, by action of tension spring 249 in this embodiment, when drive changeover rod 80 has been moved to the normal position, one pressing projection 252 of driving lever 246 is inserted in pin 244 of erase head lever 240 for the normal run, and the other pressing projection 253 comes off pin 245 of erase head lever 241 for reverse run, with pin 245 being located in groove 254. When driving lever 246 is turned around in the direction of arrow H, consequently, pin 244 is pressed by one pressing projection 252, and one erase head lever 240 alone is turned around in the direction of arrow I against the force of torsion spring 243, thereby causing erase head 177 alone to contact magnetic tape 3.

When drive changeover rod 80 has been moved to the reverse position R, as shown in FIG. 16B, projection 250 of driving lever 246 is pressed by projection 251 of drive changeover rod 80, and driving lever 246 is moved backward in the direction of arrow G' against the force of tension spring 249. Then, one pressing projection 252 of driving lever 246 comes off pin 244 and, simultaneously, the other pressing projection 253 is located in the portion of pin 245. When driving lever is turned around in the direction of arrow H, accordingly, pin 245 is pressed by the other pressing projection 253, and the other erase head lever 241 alone is turned around in the direction of arrow I' against the force of torsion spring 243, so that only erase head 178 is in contact with magnetic tape 3.

Further at the time of changeover from normal run to reverse run in a record mode, driving lever 246 is moved backward in the direction of arrow G', just as it is turned around in the direction of arrow H, but erase head 178 for reverse run contacts magnetic tape 3 simultaneously with erase head 177 for normal run being separated from magnetic tape 3. Thus, two erase heads 177 and 178 are selectively driven in correspondence with normal run and reverse run by one driving lever 246, so that two erase heads 177 and 178 are driven continuously and smoothly, even during a time of changeover between normal run and reverse run.

Although only one embodiment of this invention has been described above, it should be understood that this invention is not to be limited to such an embodiment but is able to receive various effective alternations based on the technological philosophy of this invention. For example, the changeover, shut-off mechanism, mode changing mechanism, and so on are not limited to the structure of this embodiment but are able to meet the application of various structures. Furthermore, the shut-off mode as referred to in this invention was described as a one-cycle round trip mode that was to stop the tape after a reverse run following a normal run, but it is also possible, for example, to provide shut-off pawl 141 of shut-off mechanism 148 in two places and add a one-way mode, in which the tape is stopped after the normal run, in place of the one-cycle round-trip mode.

In this embodiment, in addition, a structure was provided so as to cause changeover rod 161 of changeover mechanism 50 to be locked in the state of rearward movement by the restricting portion 236 of record initiating rod 180, but it is possible to apply various alternations to such a structure. Also, a structure was designed so as to get the operating lever 156 of mode changing mechanism 49 to be forcibly turned around by the pressing portion 232 of record initiating rod 180, but this changeover structure can be altered in various ways.

Further, this invention is not to be limited to the small-size tape recorder of the auto-reverse type using a compact cassette, but can be applied to various other reverse types of record-playback devices.

The above description is provided for a single preferred embodiment of the invention, however, it will be apparent that many modifications and variations could be effected by one skilled in the art without departing from the spirit or scope of the novel concepts of the invention, which should be determined only by the appended claims.

What is claimed is:

1. An auto-reverse type tape recording apparatus, comprising:
   a changeover mechanism for selectively changing the travel of a tape from a normal run to a reverse run by operation of changeover means;
   a mechanism for detecting an end of the tape;
   a shut-off mechanism for shutting off said travel of the tape at a tape end;
   a mode changing mechanism for changing over an operating mode from a shut-off mode, in which said travel of the tape is shut off as soon as said tape end is detected after a normal run or after a reverse run or after a reverse run following a normal run, to a repeat mode, in which said travel of the tape is repeatedly performed from normal run to reverse run under the working of said shut-off mechanism; and
   switch means including an operating lever, a mode changeover lever, and a manual changeover rod, wherein said mode changeover lever is moved by operation of said manual changeover rod and said operating lever is moved by operation of said mode changeover lever, so that said operating mode is changed over to a repeat mode by operation of said changeover means during the time that said mode changing mechanism is in said shut-off mode.

2. Tape recording apparatus according to claim 1, wherein said changeover mechanism comprises a changeover rod which is movable to either a normal position or a reverse position, a cam mechanism for driving said changeover, rod, and a gear which is driven by operation of said changeover means.

3. Tape recording apparatus according to claim 2, wherein said changeover rod includes means for selectively pressing one of respective pinch rollers provided in opposed relations to a pair of capstans against one of said capstans and means for moving an intermediate wheel so as to selectively transmit the torque of a driving wheel to either of a pair of reel bases.

4. Tape recording apparatus according to claim 1, wherein said changeover mechanism comprises a changeover rod which is slidable for location in either a normal position or a reverse position, a partially toothless gear which is rotatable and has a cam mechanism for driving said changeover rod and has toothless portions provided in predetermined peripheral portions thereof, a driving gear for intermittently driving said partially toothless gear, locking means for locking said partially toothless gear in a position where said driving gear and said toothless portion of the partially toothless gear are in opposed relation to each other, means for providing an initial torque to said partially toothless gear so as to engage said partially toothless gear with said driving gear, and means for unlocking said partially toothless gear, whereby said partially toothless gear is unlocked by operation of said changeover means and engaged with said driving gear, so that rotation of said partially toothless gear driven by said driving gear is transmitted to said changeover rod through said cam mechanism so as to move said changeover rod to either of a normal position or a reverse position.

5. Tape recording apparatus according to claim 4, wherein said locking means comprises a triggering lever capable of engaging with an abutment provided on said partially toothless gear, and an electromagnet for holding said triggering lever in either of two positions engaged with or disengaged from said abutment, whereby said triggering lever is moved to either of said two positions through controlling an electric current supplied to a solenoid of said electromagnet by operation of said changeover means.

6. Tape recording apparatus according to claim 5, wherein the electric currents supplied to said solenoid is controlled when the tape end is detected, so that said triggering lever is swung to said unlocked position.

7. Tape recording apparatus according to claim 4, wherein the number of said toothless portion and said abutment of the partially toothless gear are two, respectively, and both of said two toothless portions and said two abutments are each symmetrically arranged with respect to the center of said partially toothless gear.

8. Tape recording apparatus according to claim 1, wherein said shut-off mechanism comprises a playback operating rod changeable from a stop mode in a return position to a playback mode in a forward position, locking means for locking said playback operating rod in said forward position, a shut-off lever for driving said locking means so as to unlock said playback operating rod, and a gear which has a ratchet for driving said shut-off lever to unlock said playback operating rod and which is driven when a tape end is detected.

9. Tape recording apparatus according to claim 8, wherein said mode changing mechanism comprises said shut-off lever, and a mode changing lever by which said shut-off lever is swung from a shut-off mode position where said ratchet is engageable, to a repeat mode position where said ratchet is not engageable, so that said mode changing mechanism swings said shut-off lever in said shut-off mode position toward said repeat mode position by operation of said changeover means.

10. Tape recording apparatus according to claim 9, wherein said mode changing lever of the mode changing mechanism is swung not in said repeat mode position but in said shut-off mode position by operation of said changeover means.

11. Tape recording apparatus according to claim 8, wherein both of said cam mechanism for driving said changeover rod, and said ratchet for driving said shut-off lever are provided on said partially toothless gear, said partially toothless gear being unlocked when the tape end is detected and meshed with said ratchet, so that said shut-off lever is driven by said ratchet due to rotation of said partially toothless gear.

12. An auto-reverse type tape recorder comprising:
a record initiating rod including a restricting portion, in which by a movement from a return position to a forward position either a stop mode or a playback mode is changed over to a record mode;
a changeover mechanism for selectively changing the travel of a tape from a normal run to a reverse run and from a reverse run to a normal run by operation of changeover means; and
means including a manual changeover rod, so that in said record mode said manual changeover rod is moved away from said restricting portion for preventing engagement therebetween and preventing said manual changeover rod from moving and making said changeover means inoperable at a time of record mode after the movement of said record initiating rod to said forward position.

13. Tape recorder according to claim 12, wherein said record initiating rod prevents the operation of said changeover means only in said forward position thereof but not in said return position.

14. Tape recorder according to claim 12, wherein said changeover mechanism comprises a changeover rod which is movable and located in either of a normal position or a reverse position, and a gear which has a cam mechanism for driving said changeover rod and is rotated by operation of said changeover means.

15. Tape recorder according to claim 12, wherein said changeover mechanism comprises a changeover rod which is slidable and located in either of a normal position or a reverse position, a partially toothless gear which is rotatable and has a cam mechanism for driving said changeover rod and has toothless portions provided in predetermined portions thereof, locking means for locking said partially toothless gear in position where a driving gear for intermittently driving said partially toothless gear and either of said toothless portions are in opposed relation to each other, means for giving an initial torque to said partially toothless gear so as to engage said partially toothless gear with said driving gear, and means for unlocking said partially toothless gear, wherein said partially toothless gear is unlocked by operations of said changeover means and engaged with said driving gear, so that rotation of said partially toothless gear driven by said driving gear is transmitted to said changeover rod through said cam mechanism so as to move said changeover rod to either of a normal position or a reverse position.

16. Tape recorder according to claim 15, wherein said locking means comprises a triggering lever adapted for engaging with an abutment provided on said partially toothless gear, and an electromagnetic for holding said trigger lever in either of two positions, engaged with or disengaged from said abutment, whereby said triggering lever is moved to either of said two positions by controlling an electric current supplied to a solenoid of said electromagnet by operation of said changeover means.

17. Tape recorder according to claim 16 wherein the number of said toothless portion and said abutment of the partially toothless gear are two, respectively and both of said two toothless portions and said two abutments are each symmetrically arranged with respect to the center of said partially toothless gear.

18. Tape recorder according to claim 14, wherein said changeover rod at least includes means for selectively pressing one of a pair of respective pinch rolles provided in opposed relations to a pair of capstans against one of said capstans, and means for moving an intermediate wheel so as to selectively transmit the torque of a driving wheel to either of a pair of reel bases.

19. An auto-reverse type tape recorder comprising:
a recorder initiating rod, adapted for a movement from a return position to a forward position by which either a stop mode or a playback mode is changed over to a record mode;
a tape end mechanism for detecting a tape end;
a shut-off mechanism for shutting off the travel of a tape upon detection of a tape end;
a mode changing mechanism for changing over an operating mode from a shut-off mode, in which said travel of the tape is shut-off as soon as said tape end is detected after normal run or reverse run or after a reverse run following a normal run to a repeat mode, in which said travel of the tape is repeatedly performed from a normal run to a reverse run by operation of said shut-off mechanism; and
means including an operation lever, cooperating with said record initiating rod for changing over said mode changing mechanism in a repeat mode to said shut-off mode in which said travel of the tape is shut-off as soon as said tape end is detected after normal or reverse run or to said shut-off mode in which said travel of the tape is shut-off as soon as said tape and is detected after a reverse run following a normal run when said record initiating rod is moved to said forward position.

20. Tape recorder according to claim 19, wherein said shut-off mechanism comprises an operating rod changeable from a stop mode in a return position to a playback mode or a record mode in a forward position, locking means for locking said operating rod in said forward position, a shut-off lever for driving said locking means so as to unlock said operating rod, and a gear which has a ratchet for driving said shut-off lever so as to unlock said operating rod, in which said shut-off lever is driven when a tape end is detected.

21. Tape recorder according to claim 20, wherein said mode changing mechanism comprises said shut-off lever and a mode changing lever by which said shut-off lever is swung form a one-way mode position or a round-trip mode position where said ratchet is engageable, to a repeat mode position where said ratchet is not engageable, or the reverse, so that said means for changing over said mode changing mechanism has such a function as to move said shut-off lever to said one-way mode position or said round-trip mode position by operation of said mode changing lever located in said repeat mode position, when said record initiating rod is moved toward said forward position.

22. Tape recorder according to claim 19, wherein said shut-off mechanism comprises a partially toothless gear which is rotatable and has a ratchet for driving said shut-off lever and has toothless portions provided in predetermined positions thereof, a driving gear for intermittently driving said partially toothless gear, locking means for locking said partially toothless gear in a position where said driving gear and said toothless portion of the partially toothless gear are in opposed relation to each other, means for giving an initial torque to said partially toothless gear so as to engage said partially toothless gear with said driving gear and means for unlocking said partially toothless gear, whereby said partially toothless gear is unlocked when the tape end is detected, and meshed with said driving gear, said shut-off lever being driven by said ratchet due to rotation of said partially toothless gear.

23. Tape recorder according to claim 22, wherein said locking means comprises a triggering lever capable of engaging with a locking pawl provided on said partially toothless gear, and an electromagnet for holding said triggering lever in either of two positions engaged with or disengaged from said locking pawl, whereby said triggering lever is moved to either of said two positions through controlling an electric current supplied to a solenoid of said electromagnet due to detection of tape end.

24. Tape recorder according to claim 23, wherein the number of said toothless portion and said locking pawl of the partially toothless gear are two, respectively and both of said two toothless portions and said two locking pawls are symmetrically arranged each other with respect to the center of said partially toothless gear.

* * * * *

UNITED STATES PATENT AND TRADEMARK OFFICE
CERTIFICATE OF CORRECTION

PATENT NO. : 4,799,116
DATED : January 17, 1989
INVENTOR(S) : Mitsuru Ida et al.

It is certified that error appears in the above-identified patent and that said Letters Patent is hereby corrected as shown below:

Column 6, line 7, change "k" second occurence to --k'--.

Column 24, line 29, change "electromagnetic" to --electromagnet--
line 51, change "recorder" to --record--.

Signed and Sealed this

Twenty-eighth Day of November 1989

Attest:

JEFFREY M. SAMUELS

Attesting Officer     Acting Commissioner of Patents and Trademarks